US007487039B2

(12) United States Patent
Rumbo et al.

(10) Patent No.: US 7,487,039 B2

(45) Date of Patent: Feb. 3, 2009

(54) SYSTEM AND METHOD FOR GENERATING FLYABLE PATHS FOR AN AIRCRAFT

(75) Inventors: Jim R. Rumbo, Glendale, AZ (US); Michael R. Seastrand, Prescott, AZ (US); James K. Haberstock, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/506,069

(22) Filed: Aug. 16, 2006

(65) Prior Publication Data

US 2009/0005967 A1 Jan. 1, 2009

(51) Int. Cl.
*G01C 21/34* (2006.01)

(52) U.S. Cl. ....................... 701/202; 209/211; 340/995; 709/239

(58) Field of Classification Search .................. 701/50, 701/202, 211, 209, 206; 340/995; 709/239; *G01C 21/34*
See application file for complete search history.

(56) References Cited

U.S. PATENT DOCUMENTS

| | | | | |
|---|---|---|---|---|
| 5,321,615 | A * | 6/1994 | Frisbie et al. | 701/24 |
| 6,529,821 | B2 * | 3/2003 | Tomasi et al. | 701/202 |
| 6,816,780 | B2 * | 11/2004 | Naimer et al. | 701/206 |
| 7,003,383 | B2 * | 2/2006 | Rumbo et al. | 701/3 |
| 7,089,091 | B2 * | 8/2006 | Artini et al. | 701/3 |
| 2002/0161514 | A1 * | 10/2002 | Shinagawa | 701/209 |
| 2003/0033083 | A1 * | 2/2003 | Nakashima et al. | 701/211 |
| 2003/0135304 | A1 * | 7/2003 | Sroub et al. | 701/1 |
| 2003/0139877 | A1 | 7/2003 | Dwyer | |
| 2004/0078136 | A1 | 4/2004 | Cornell et al. | |
| 2004/0204821 | A1 * | 10/2004 | Tu | 701/200 |
| 2005/0283281 | A1 * | 12/2005 | Hartmann et al. | 701/4 |
| 2006/0031006 | A1 * | 2/2006 | Stenbock et al. | 701/200 |
| 2006/0129285 | A1 * | 6/2006 | Gremmert | 701/3 |
| 2006/0235581 | A1 * | 10/2006 | Petillon | 701/3 |
| 2006/0259234 | A1 * | 11/2006 | Flynn et al. | 701/202 |

FOREIGN PATENT DOCUMENTS

| | | |
|---|---|---|
| EP | 1496461 A1 | 1/2005 |

OTHER PUBLICATIONS

PCT Search Report, PCT/US2007/075784 dated Jun. 26, 2008.

* cited by examiner

*Primary Examiner*—Tuan C To
(74) *Attorney, Agent, or Firm*—Ingrassia Fisher & Lorenz, P.C.

(57) ABSTRACT

A system and method are provided for generating a flight plan between an initial position and a destination. An input device is configured to receive inputs related to the destination; a memory configured to store data related to the destination; and a processor is configured to retrieve data from the memory and to generate the flight plan from the initial position to the destination. The flight plan includes a plurality of legs and an initial plurality of transitions between the legs. The processor is further configured to determine whether each of the initial plurality of transitions between the legs are flyable and to provide a flyable transition between the legs if the transition is not flyable.

16 Claims, 27 Drawing Sheets

4 OR MORE LEGS WITH 2 OR MORE SHORT LEGS

LARGE COURSE CHANGE

OVERFLY

SPECIFIED TURN DIRECTION

DISCONTINUOUS LEGS

CONNECT A START POSTION AND COURSE TO A DESIRED TRACK

SYSTEM AND METHOD FOR GENERATING FLYABLE PATHS FOR AN AIRCRAFT

FIELD OF THE INVENTION

The present invention generally relates to a system and method for generating flight plans that have flyable paths for the aircraft, particularly flight plans with flyable transitions between two or more legs.

BACKGROUND OF THE INVENTION

In a modern commercial aircraft, a flight crew makes flight plan entries and modifications through a Flight Management System (FMS). The FMS receives inputs related to the desired destination, and the FMS builds a flight plan based on the inputs. The flight plan typically includes a plurality of legs that correspond to straight segments to be flown by the aircraft. The flight plan includes single curve transitions between the legs. At times, the transition between two or more legs results in the FMS displaying a flight plan that is not physically flyable by the aircraft, particularly at increased speeds. When confronted with these unflyable transitions between legs, the aircraft flies a path that is different from the path displayed by the FMS. The aircraft then corrects itself and returns to the flight plan. This can result in a level of uncertainty for the pilot since the aircraft has periods in which the aircraft may not be flying according to the displayed and predetermined flight path.

Accordingly, it is desirable to provide an improved system and method for generating and displaying flight plans that have flyable paths for the aircraft, particularly flight plans with flyable transitions between two or more legs.

Desirable features and characteristics of the present invention will become apparent from the subsequent detailed description of the invention and the appended claims, taken in conjunction with the accompanying drawings and this background of the invention.

BRIEF SUMMARY OF THE INVENTION

In one exemplary embodiment, a system is provided for generating a flight plan between an initial position and a destination. The system includes an input device configured to receive inputs related to the destination; a memory configured to store data related to the destination; and a processor is configured to retrieve data from the memory and to generate the flight plan from the initial position to the destination. The flight plan includes a plurality of legs and an initial plurality of transitions between the legs. The processor is further configured to determine whether each of the initial plurality of transitions between the legs is flyable and to provide a flyable transition between the legs if the transition is not flyable.

In another exemplary embodiment, a method is provided for generating a flight plan between an initial position and a destination. The flight plan includes a plurality of legs. The method includes providing an initial plurality of transitions between the legs; determining whether each of the initial plurality of transitions is flyable; and replacing any unflyable initial transition with a flyable transition.

In another exemplary embodiment, a method of manufacturing is provided for a system for generating a flight plan between an initial position and a destination. The method includes providing an input device configured to receive inputs related to the destination; providing a memory configured to store data related to the destination; and providing a processor configured to retrieve data from the memory and to generate the flight plan from the initial position to the destination. The flight plan includes a plurality of legs and an initial plurality of transitions between the legs. The processor is further configured to determine whether each of the initial plurality of transitions between the legs is flyable and to provide a flyable transition between the legs if the transition is not flyable.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
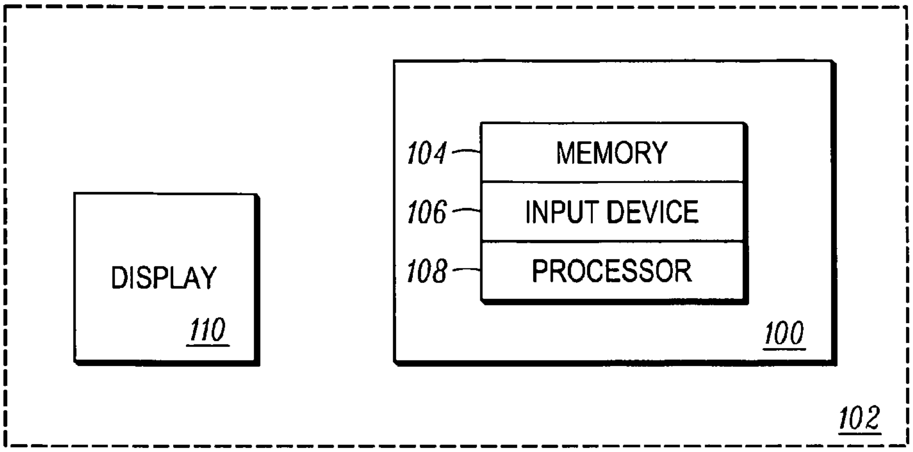
FIG. 1 is a schematic representation of the system in accordance with an exemplary embodiment of the present invention.

Referring to FIG. 1, a system 100 is illustrated for assembling a flight plan for an aircraft. The system 100 can be a stand-alone system, integrated with another system, and/or can be a stand-alone system configured to communicate with another system. In addition, the system 100 can be configured for assembling a flight plan for any number of aircraft in any number of applications. In the illustrated embodiment, the system 100 is integrated with a Flight Management System (FMS) 102 and can be configured for assembling a flight plan of a commuter, long range, wide body jet airplane, and other types of aircraft.

The system 100 can include a memory 104 that is configured to store data associated with multiple waypoints that can be used in assembling the flight plan. The data can be any information associated with a waypoint, which as used herein refers to a uniquely identified latitude and longitude location or point. The data can be originally stored in the memory 104 and can be subsequently updated with any number of memory storage and memory updating techniques known in the art.

The system 100 can also include an input device 106 that enables a user to input a starting point and an ending point for the flight plan, as well as any other information related to the flight plan. The input device 106 can be any device suitable for accepting input from a user of the system 100, such a touch-pad, joystick, mouse, trackball, or keyboard.

The system 100 can further include a processor 108 that can include any number of microprocessors, memories, storage devices, interfaces, and other processor components. The processor 108 is configured to access data in the memory 104 and selectively retrieve data related to the waypoints along the flight route.

The system 100 may also include, or be configured to be coupled to, at least one display 110. The display 110 can be any current or future display that is suitable for producing a visual representation of the flight plan. For example, the display 110 can be a color or monochrome cathode ray tube (CRT) display, liquid crystal display (LCD), plasma display, electro-luminescent display, vacuum fluorescent display, heads-up display, heads-down display, helmet mounted display, light emitting diode display, or the like. The display 110 can include a Graphical User Interface (GUI).

In accordance with the present invention, the route between waypoints generally includes at least two legs. As used herein, the term "leg" refers to a straight or curved portion of the flight plan that terminates at a waypoint. The system 100 can provide a standard, single curve transition between two legs. However, the system 100 can also detect when the single curve transition will result in an unflyable path and provide continuous path (or "multi-curve") transitions when the single curve transitions are unflyable or otherwise unsuitable within the flight plan. In one embodiment, the system 100 can calculate an initial, single curve transition between each of the legs. The system 100 then determines whether the initial, single curve transition is flyable. If the system 100 determines that the initial, single curve transition is not flyable, the system calculates a continuous path transition and replaces the single curve transition with the continuous path transition.

As an example, the term "short leg" refers to a leg in which a transition between it and a second leg creates a discontinuity in conventional systems. In other words, the transition between a first leg and a short leg is not long enough to allow a single curve transition without overlapping another single curve transition. As noted above, conventional systems typically provide flight plans having short legs with transitions that are unflyable, particularly at high speeds. The present invention can detect these unflyable leg transitions and provide flyable transitions between the legs.

Figure 2A:
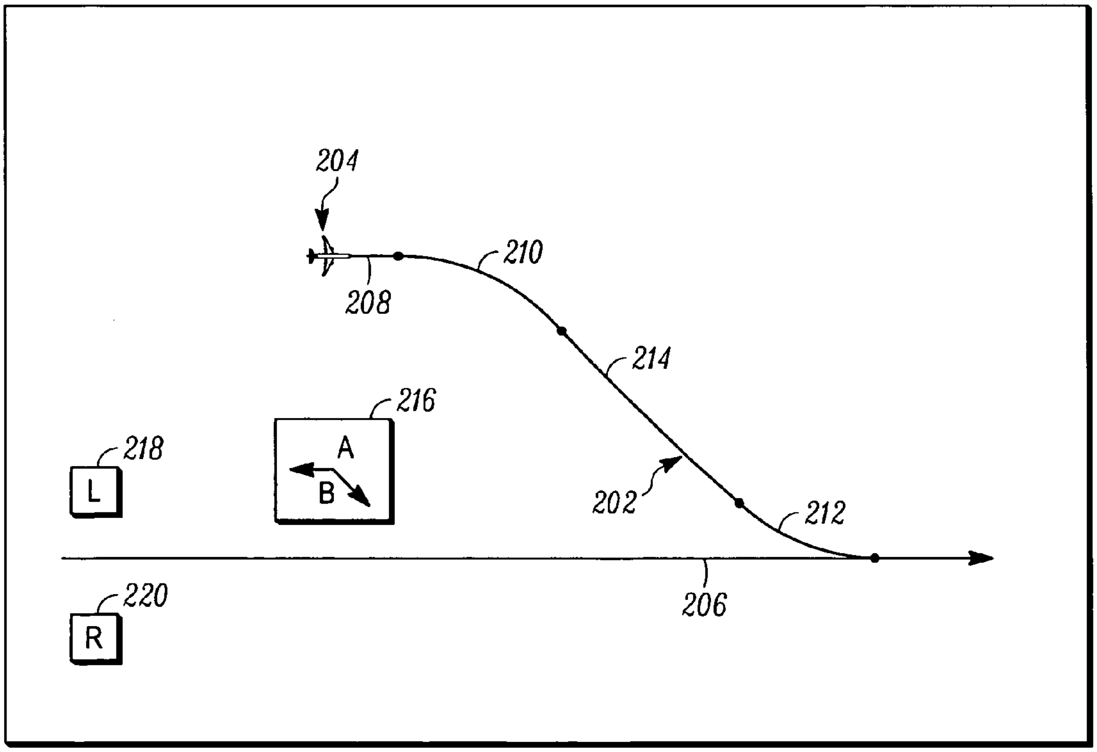
FIG. 2A is a graphic depicting elements of a system and method in accordance with an exemplary embodiment of the present invention.

FIG. 2A illustrates at least some terminology and parameters that can be used by exemplary embodiments to construct a flyable path 202 for aircraft, particularly transitions or paths between multiple legs of a flight plan. In the path of FIG. 2A, a start point 204 is a point on the previous leg. The system and method provides a path 202 from the start point 204 to a second leg 206. The path 202 will not include any discontinuities. Furthermore, the end course of any segment and the start course of the next segment or leg will be equal to result in no kinks in the path 202.

Initially, the path 202 can include a segment corresponding to the roll anticipation distance or "RAD segment" 208. The RAD segment 208 is the distance prior to the start of a curved segment that the aircraft will initiate a change in roll to attain the bank angle required for the subsequent curved segment. The continuous path transition may or may not include a RAD segment 208. If no RAD segment 208 is provided, the first action by the aircraft will be a turn.

Generally, the path 202 will include one or more turns 210, 212. In FIG. 2, the curved segment includes a first turn 210 and a second turn 212. The path 202 can also include a straight intercept segment 214 between the two turns 210, 212. The intercept segment 214 is typically limited to a 45° angle with respect to the second leg 206, although the angle of the intercept segment 214 can be modified.

A capture zone legend 216 indicates the initial turn direction of the aircraft, which is dependent on the initial orientation of the aircraft and the position of the aircraft relative to the second leg 206. The aircraft can also be designated on a left side 218 or a right side 220 of the second leg 206, as indicated in FIG. 2A. Generally, in the view of FIG. 2A, if the aircraft is above the second leg 206, the aircraft is on the left side 218, and if the aircraft is below the second leg 206, the aircraft is on the right side 220. In FIG. 2, assuming that the right and left sides of a horizontal line represent 90° and 270°, respectively, if the aircraft is oriented at an angle between 270° and 135° and is on the left side 218 of the second leg 206, the aircraft is in zone A and the initial turn will be right. If the aircraft is oriented at an angle between 135° and 270° and is on the right side 220 of the second leg 206, the aircraft is in zone B and the initial turn will be left.

In some cases, the initial turn direction of the aircraft will be specified, for example, by obstacles or by restricted airspace. The required initial turn direction will dictate whether the path flown by the aircraft will be a "long" or "short" path. A long path will typically involve a looped first turn, and the short path will be more direct, without a looped portion. In general, the short path can be the default path to minimize the length of the lateral path flown by the aircraft.

Figure 2B:
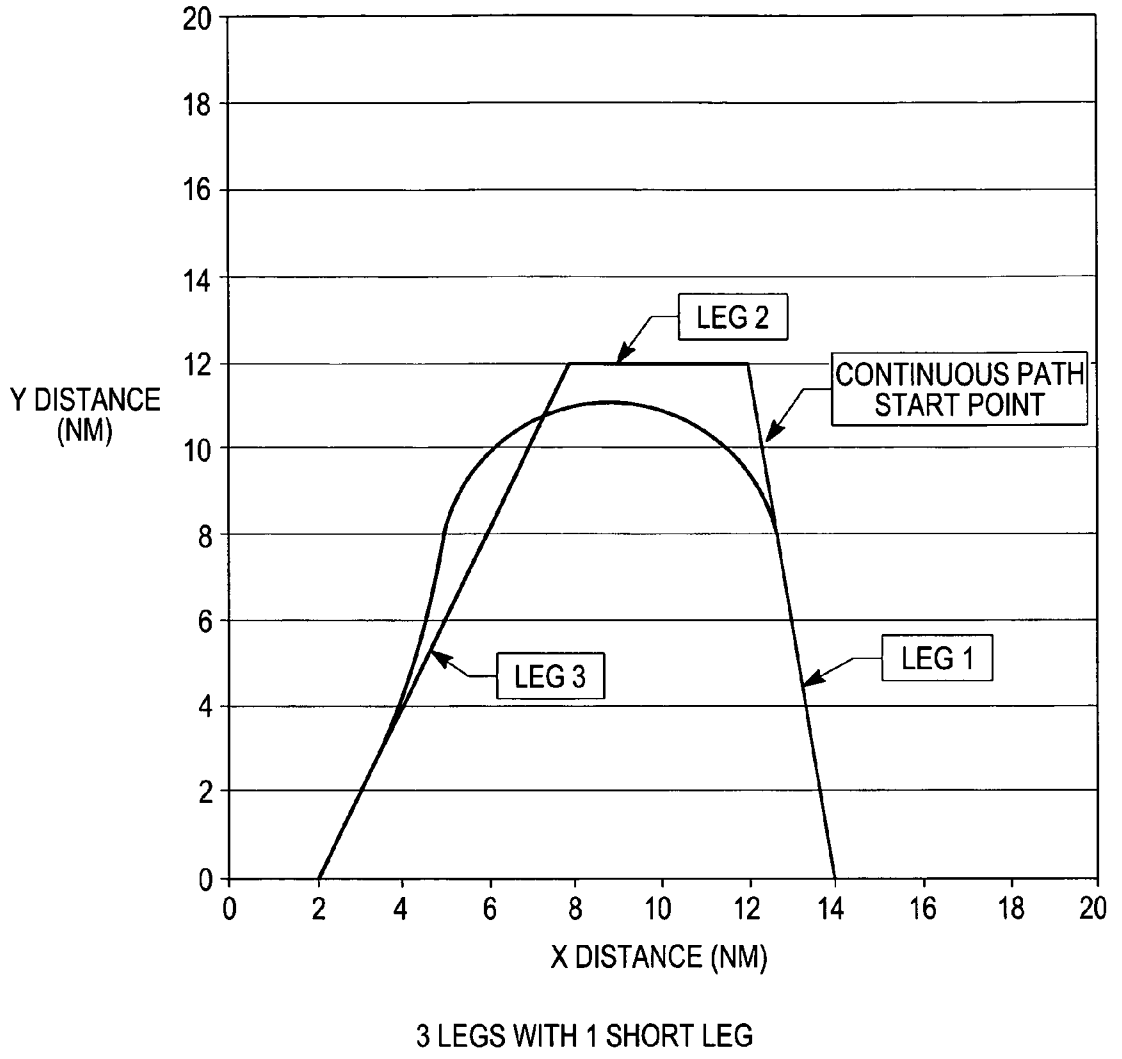
FIGS. 2B-H are graphics depicting situations in which an exemplary embodiment of the present invention generates a continuous path transition.
Figure 2C:
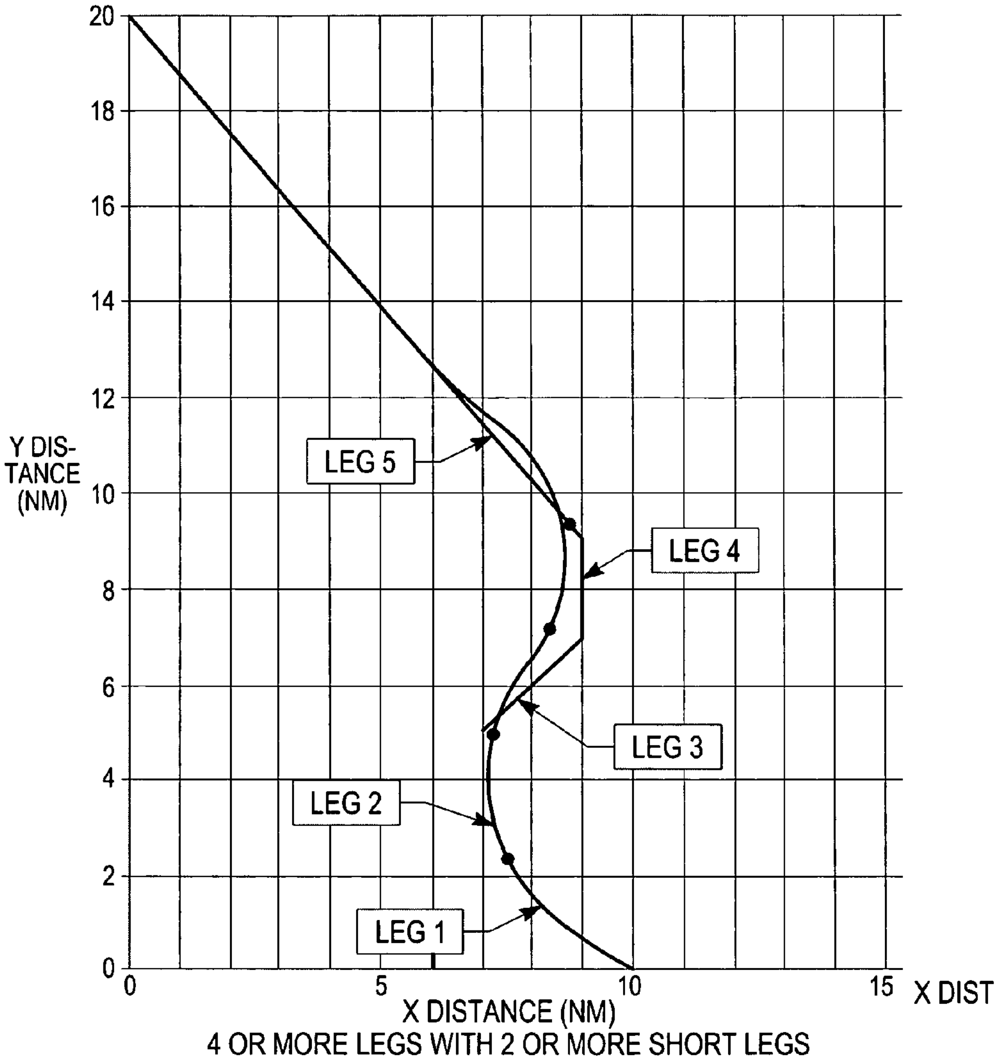
Figure 2D:
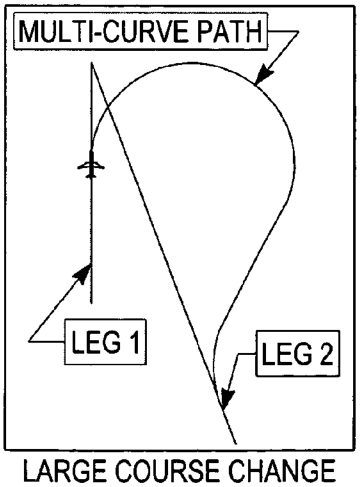
Figure 2E:
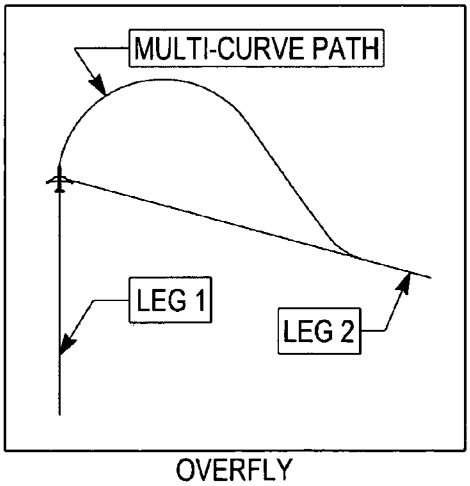
Figure 2F:
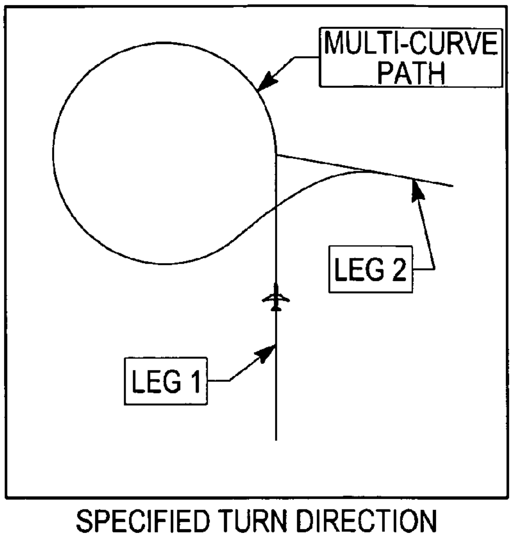
Figure 2G:
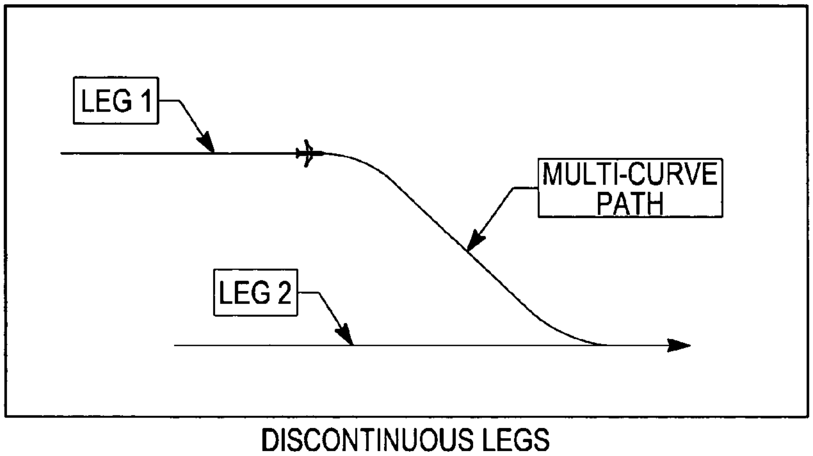
Figure 2H:
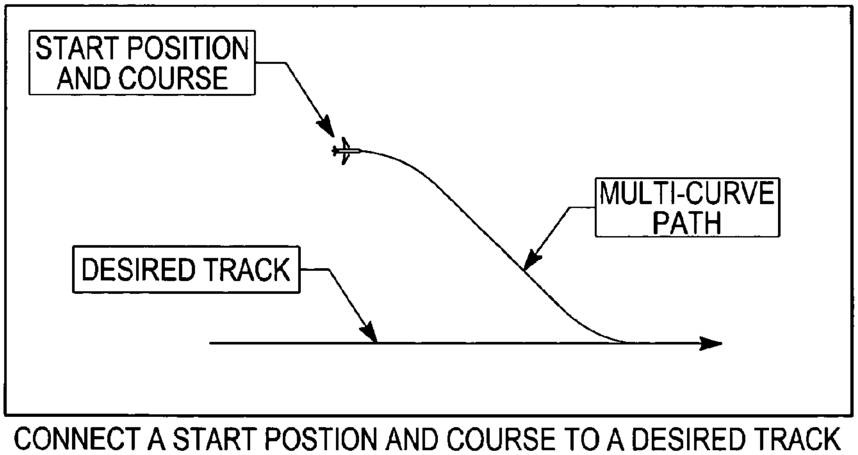

FIGS. 2B-2H illustrate seven examples of situations in which the system 100 provides a continuous path transition according to the present invention. In particular, an exemplary embodiment of the present invention provides a continuous path transition for each of the examples shown in FIGS. 2B-2H, whereas the single curve transitions provided in conventional systems would result in an unflyable flight plan. Among other things, the situations illustrated in FIGS. 2B-2H can be a result of high speeds, short legs, discontinuous legs, or limited bank angles. FIG. 2B illustrates two legs separated by a short leg. FIG. 2C illustrates at least four legs with two or more short legs. FIG. 2D illustrates two legs that result in a large course change. FIG. 2E illustrates two legs that result in an overfly. FIG. 2F illustrates a transition between two legs that requires a specific turn direction. FIG. 2G illustrates a transition between two discontinuous legs. FIG. 2H illustrates a transition between a start position and a desired leg.

Each continuous path transition from the initial point 204 to the second leg 206 can be grouped into one of seven types or "cases" of short paths and one of six cases of long paths. The seven cases of short paths are illustrated in FIGS. 3-9, and the six cases of long paths are illustrated in FIGS. 10-15.

Figure 3:
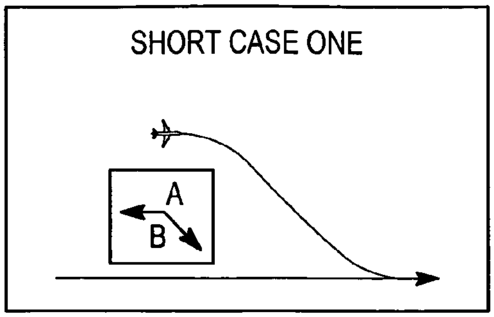
FIG. 3 is a schematic representation of the geometry of a case one for short paths in accordance with an exemplary embodiment of the present invention.
Figure 4:
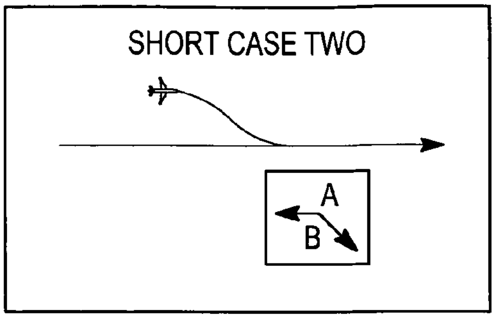
FIG. 4 is a schematic representation of the geometry of a case two for short paths in accordance with an exemplary embodiment of the present invention.
Figure 5:
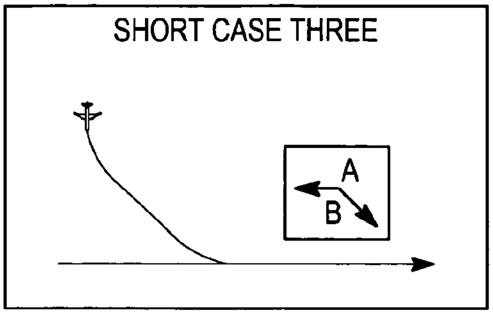
FIG. 5 is a schematic representation of the geometry of a case three for short paths in accordance with an exemplary embodiment of the present invention.
Figure 6:
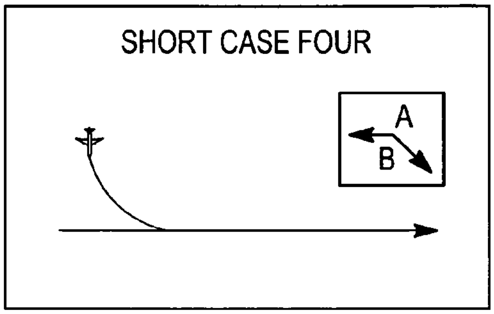
FIG. 6 is a schematic representation of the geometry of a case four for short paths in accordance with an exemplary embodiment of the present invention.
Figure 7:
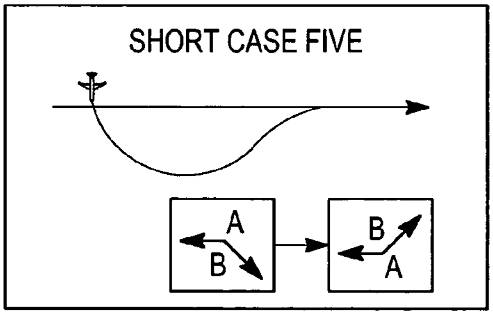
FIG. 7 is a schematic representation of the geometry of a case five for short paths in accordance with an exemplary embodiment of the present invention.
Figure 8:
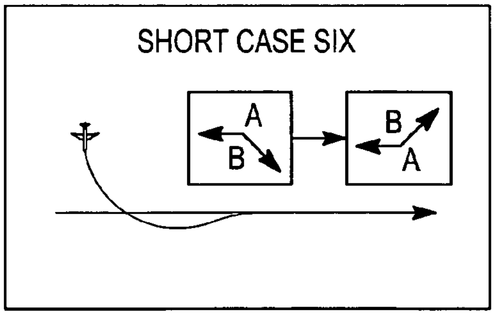
FIG. 8 is a schematic representation of the geometry of a case six for short paths in accordance with an exemplary embodiment of the present invention.
Figure 9:
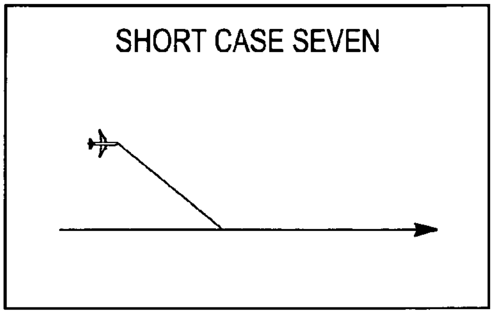
FIG. 9 is a schematic representation of the geometry of a case seven for short paths in accordance with an exemplary embodiment of the present invention.

As shown in FIG. 3, case one for the short paths includes a first turn in a first direction, a second turn in a second direction, and a straight segment between the first and second turns. As shown in FIG. 4, case two for the short paths is similar to the case one for the short paths except that there is no straight segment between the first and second turns. As shown in FIG. 5, case three for the short paths includes a first turn in the second direction, a second turn in the second direction, and a straight segment between the first and second turns. As shown in FIG. 6, case four for the short paths includes a first turn in the second direction. As shown in FIG. 7, case five for the short paths includes a first turn in the second direction that overshoots the second leg, a second turn in the first direction, and a straight segment between the first and second turns. As shown in FIG. 8, case six for the short paths is similar to the case five except that there is no straight segment between the first and second turns. As shown in FIG. 9, case seven for the short paths includes a single straight segment with a small intercept angle, for example an intercept angle of approximately 1°. Generally, case seven for the short paths is used when the first leg is within 0.05 NM (nautical miles) and 3° of leg two.

Figure 10:
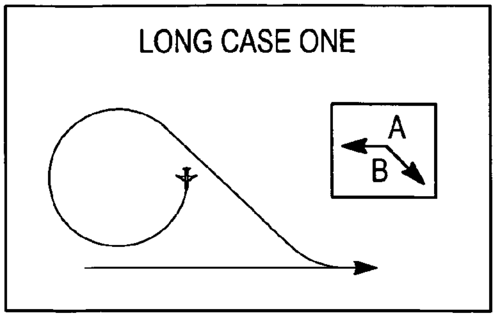
FIG. 10 is a schematic representation of the geometry of a case one for long paths in accordance with an exemplary embodiment of the present invention.
Figure 11:
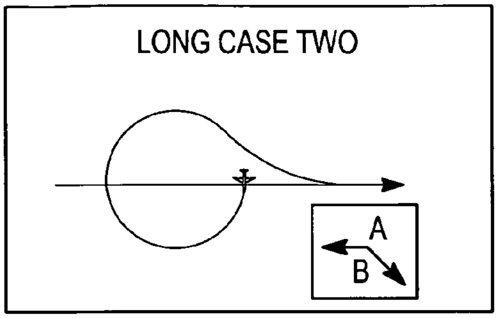
FIG. 11 is a schematic representation of the geometry of a case two for long paths in accordance with an exemplary embodiment of the present invention.
Figure 12:
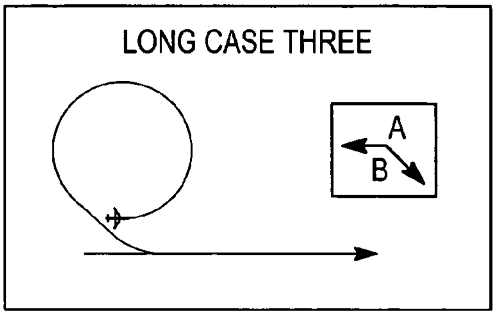
FIG. 12 is a schematic representation of the geometry of a case three for long paths in accordance with an exemplary embodiment of the present invention.
Figure 13:
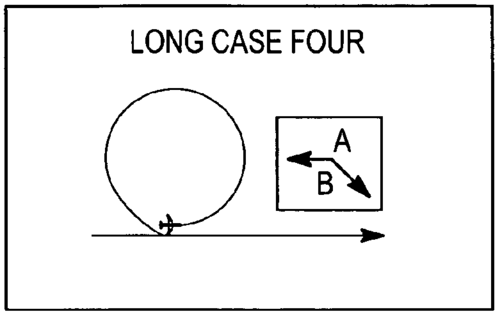
FIG. 13 is a schematic representation of the geometry of a case four for long paths in accordance with an exemplary embodiment of the present invention.
Figure 14:
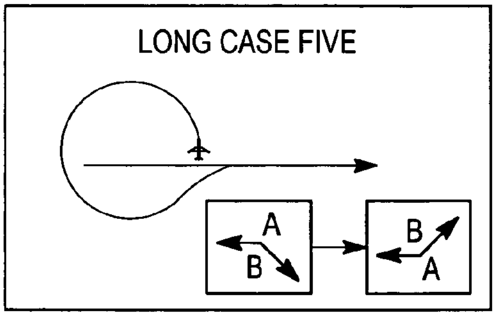
FIG. 14 is a schematic representation of the geometry of a case five for long paths in accordance with an exemplary embodiment of the present invention.
Figure 15:
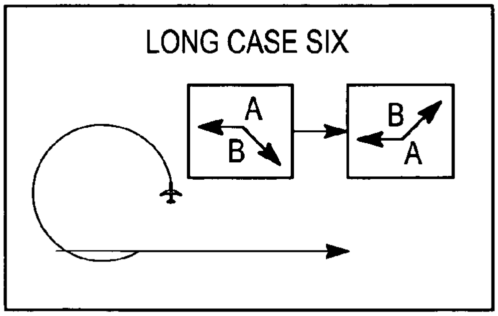
FIG. 15 is a schematic representation of the geometry of a case six for long paths in accordance with an exemplary embodiment of the present invention.

As shown in FIG. 10, case one for the long paths includes a first looped turn in a first direction, a second turn in a second direction, and a straight segment between the first and second turns. As shown in FIG. 11, case two for the long paths includes a first looped turn in the first direction that overshoots the second leg, and a second turn in the second direction. As shown in FIG. 12, case three for the long paths includes a first looped turn in the second direction, a second turn in the second direction, and a straight segment between the first and second turns. As shown in FIG. 13, case four for the long paths includes a first turn in the second direction and a second turn in the second direction. As shown in FIG. 14, case five for the long paths includes a first looped turn in the second direction that overshoots the second leg, a second turn in the first direction, and a straight segment between the first and second turns. As shown in FIG. 15, case six for the long path includes a first looped turn in the second direction that overshoots the second leg and a second turn in the first direction.

Figure 16:
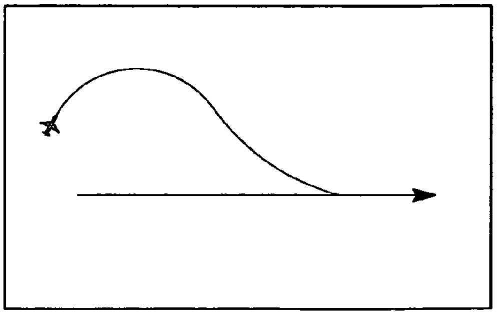
FIG. 16 illustrates a path calculated in accordance with an exemplary embodiment of the present invention that has a low roll angle and a high intercept angle.
Figure 17:
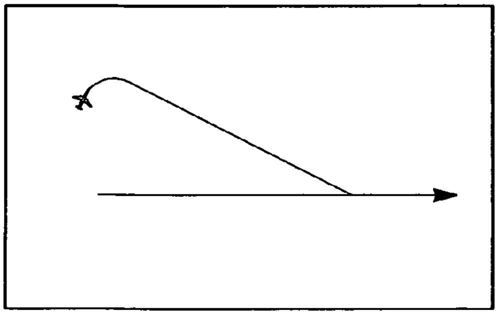
FIG. 17 illustrates a path calculated in accordance with an exemplary embodiment of the present invention that has a high roll angle and a low intercept angle.

Another aspect of an exemplary embodiment of the present invention includes the consideration of roll and intercept angle aggression factors. FIG. 16 is an example of a path with a low roll angle aggression factor, and a high intercept angle aggression factor. FIG. 17 is an example of a path with a high roll angle aggression factor, but a low intercept angle aggression factor. The calculated path can balance the aggressiveness between roll and intercept angles. A high aggression factor will cause the roll angle and intercept angles to be high. A low aggression factor will cause the roll angle and intercept angles to be low. The roll and intercept angle aggression factors can be, for example, between 0 and 10. In exemplary embodiments, the same magnitude of aggression factor can be used for each of the roll angle aggression factor and the intercept angle aggression factor. In the exemplary embodiment, a value of 5 is set to be the default case, but the factor can be adjusted as desired.

Figure 18:
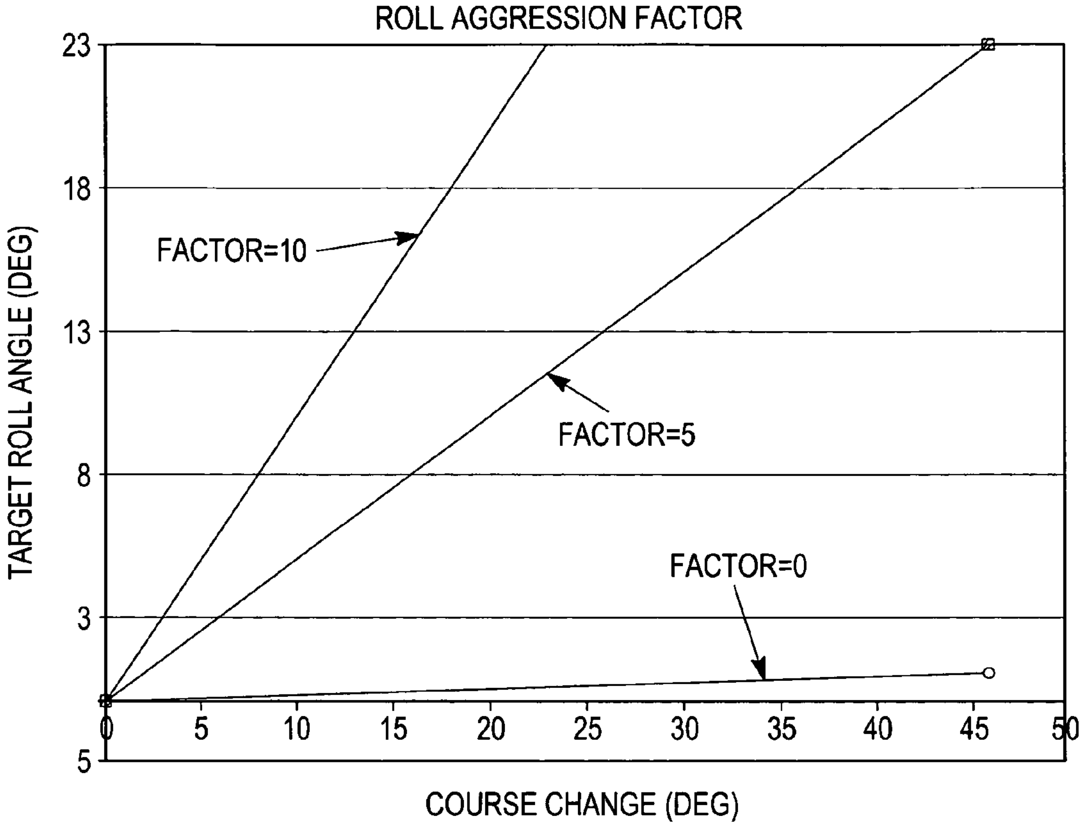
FIG. 18 illustrates the roll aggression factors utilized in an exemplary embodiment of the present invention.
Figure 19:
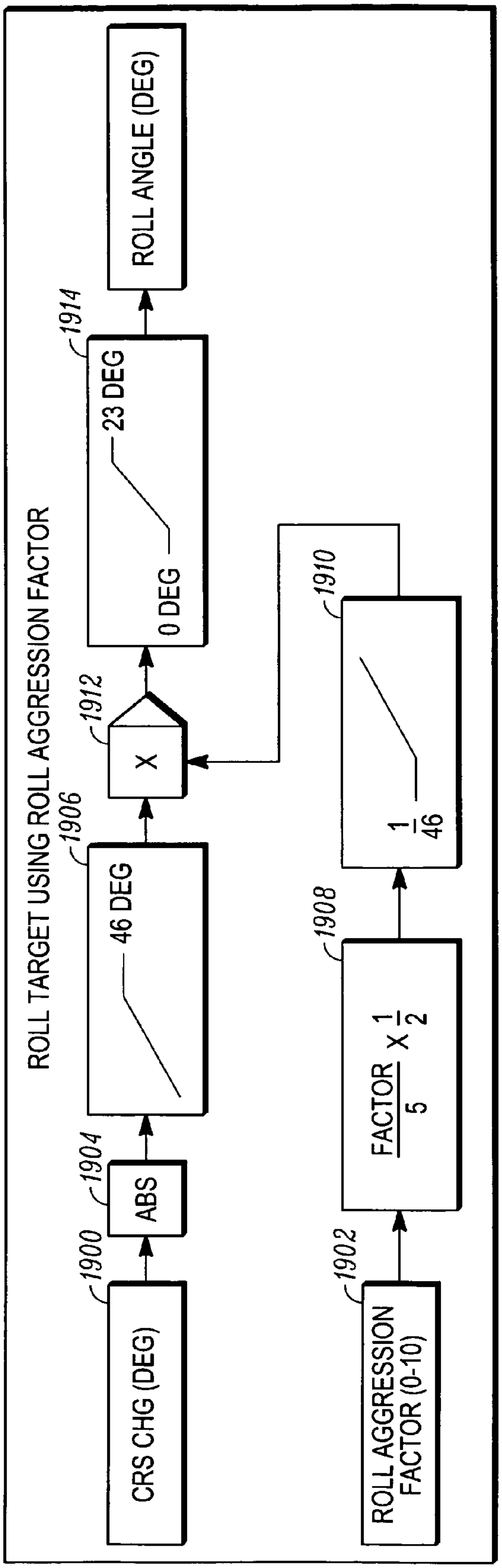
FIG. 19 is an algorithm used to calculate the roll angle using the roll aggression factor in accordance with an exemplary embodiment of the present invention.

FIGS. 18 and 19 show a plot and algorithm, respectively, for utilizing the roll aggression factor. As shown in FIG. 18, as the degree of course change increases, the target roll angle increases. Moreover, as the roll aggression factor increases, the rate at which the target roll angle increases relative to the course change also increases. This is illustrated by the plots for roll aggression factors of 0, 5, and 10.

As shown in FIG. 19, the roll angle is used in the calculations for the transitions between flight legs, particularly to generate a constant radius turn for a specific ground speed, has two primary inputs comprising the course change and the roll aggression factor, as respectively indicated by boxes 1900 and 1902. The course change can be defined as the angle difference between the two legs. In the exemplary embodiment, the absolute value of the course change, as indicated by box 1904, is limited to 46°, as indicated by box 1906. The roll aggression factor is divided by 5 and halved, as shown in box 1908, and limited to 1/46°, as indicated by box 1910. The results of boxes 1906 and 1910 are multiplied, as indicated by box 1912. The results of box 1912 are limited to a number between 0° and 23°, as indicated by box 1914, to result in the roll angle. The scaling factors in box 1908 and the limits in boxes 1906, 1910, and 1914 can be adjusted as necessary or desired.

Figure 20:
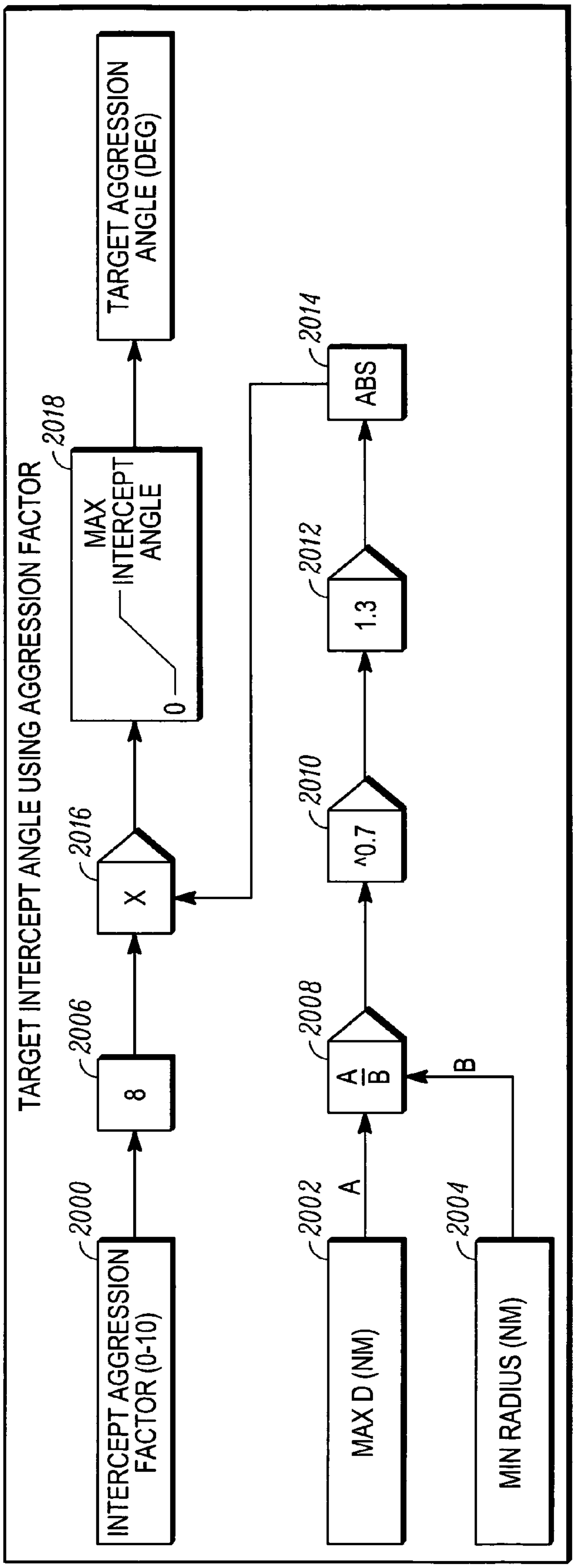
FIG. 20 is the algorithm used to calculate the intercept angle using the aggression factors in accordance with an exemplary embodiment of the present invention.

FIG. 20 shows the algorithm for the target intercept angle, which is used to generate the straight line path from the initial leg to the second leg. The calculations for the target intercept angle include the intercept aggression factor, indicated by box 2000, and the maximum D and minimum radius, as indicated by box 2002 and 2004, respectively. The default intercept aggression factor is set to 5, and the maximum D value is the maximum distance the aircraft would fly from the second leg using the roll aggression factor. The intercept aggression factor is multiplied by a factor of 8, as indicated by box 2006. As respectively indicated by boxes 2008, 2010, and 2012, the maximum distance is divided by the minimum radius, raised to a power of 0.7, and multiplied by 1.3. The absolute value of the result of box 2012, as indicated by box 2014, is multiplied by the results of box 2006, as indicated by box 2016. The result of box 2016 is limited to an angle between 0° and the maximum intercept angle, as indicated by box 2018, to result in the target intercept angle. The scaling factors in box 2006, 2010, and 2012 and the limits in box 2018 can be adjusted as necessary or desired.

Figure 21A:
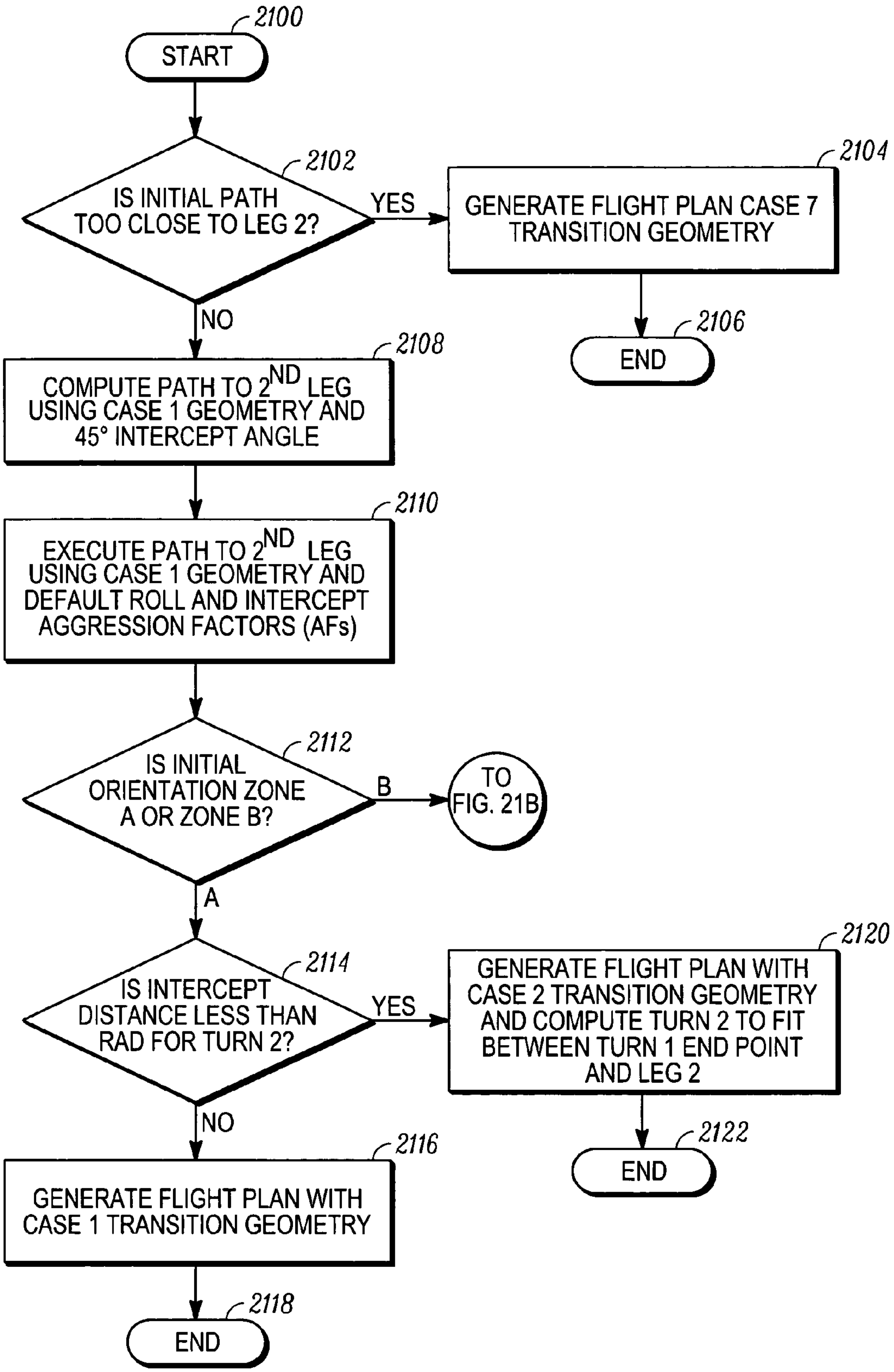
FIG. 21 is a logic determination flowchart used in accordance with an exemplary embodiment of the present invention to determine the proper geometric case for a two leg transition.
Figure 21B:
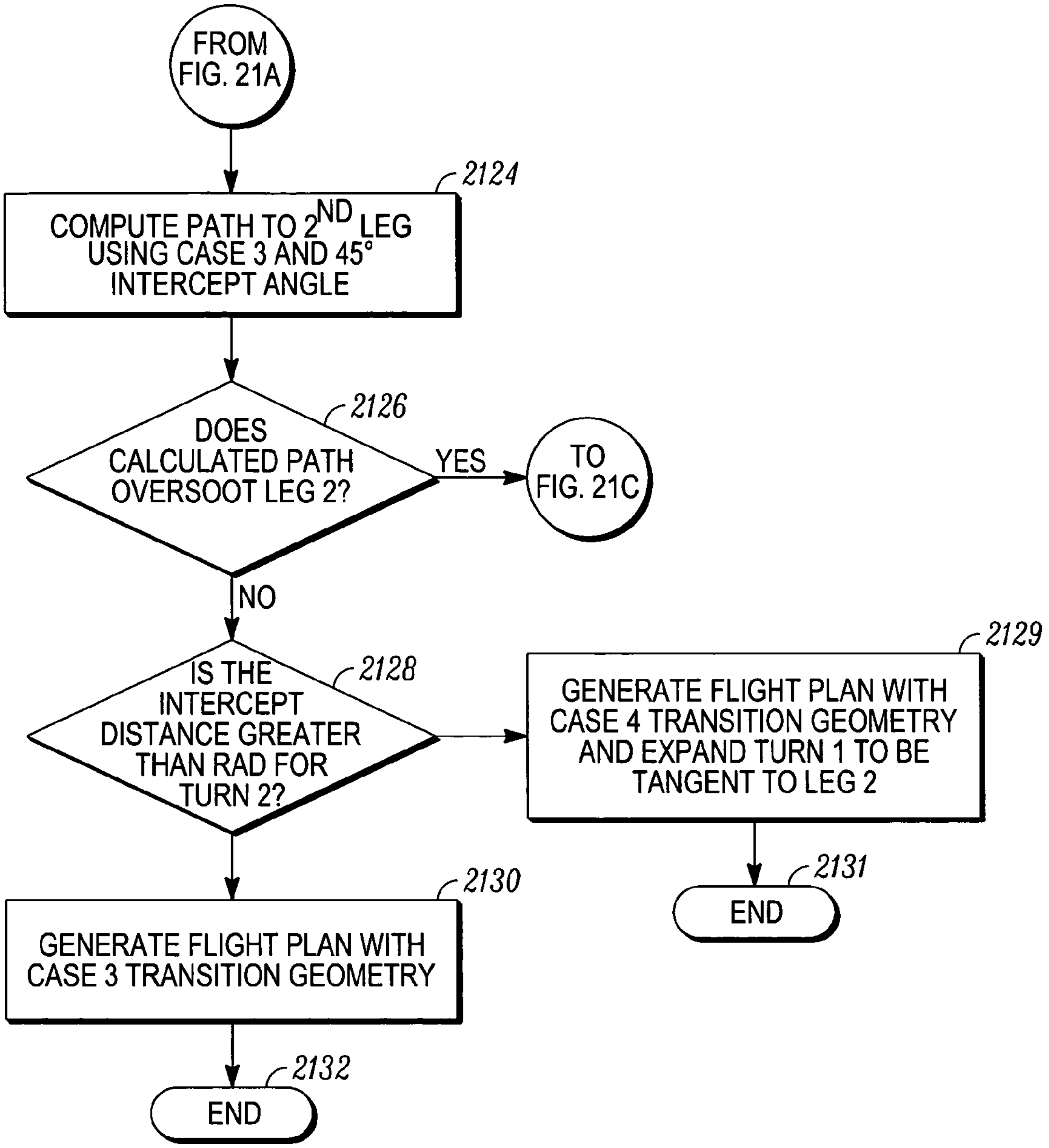
Figure 21C:
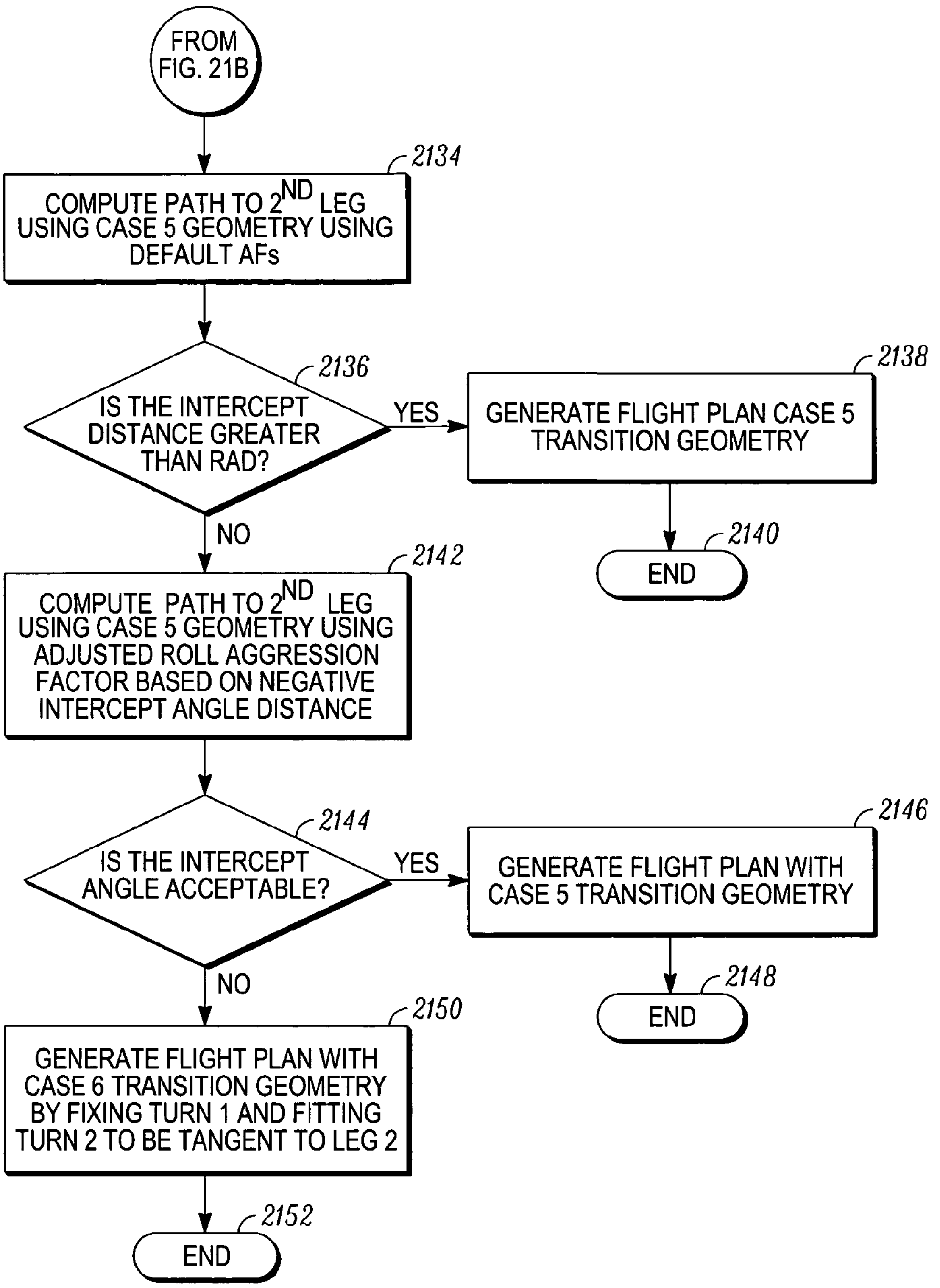
Figure 22:
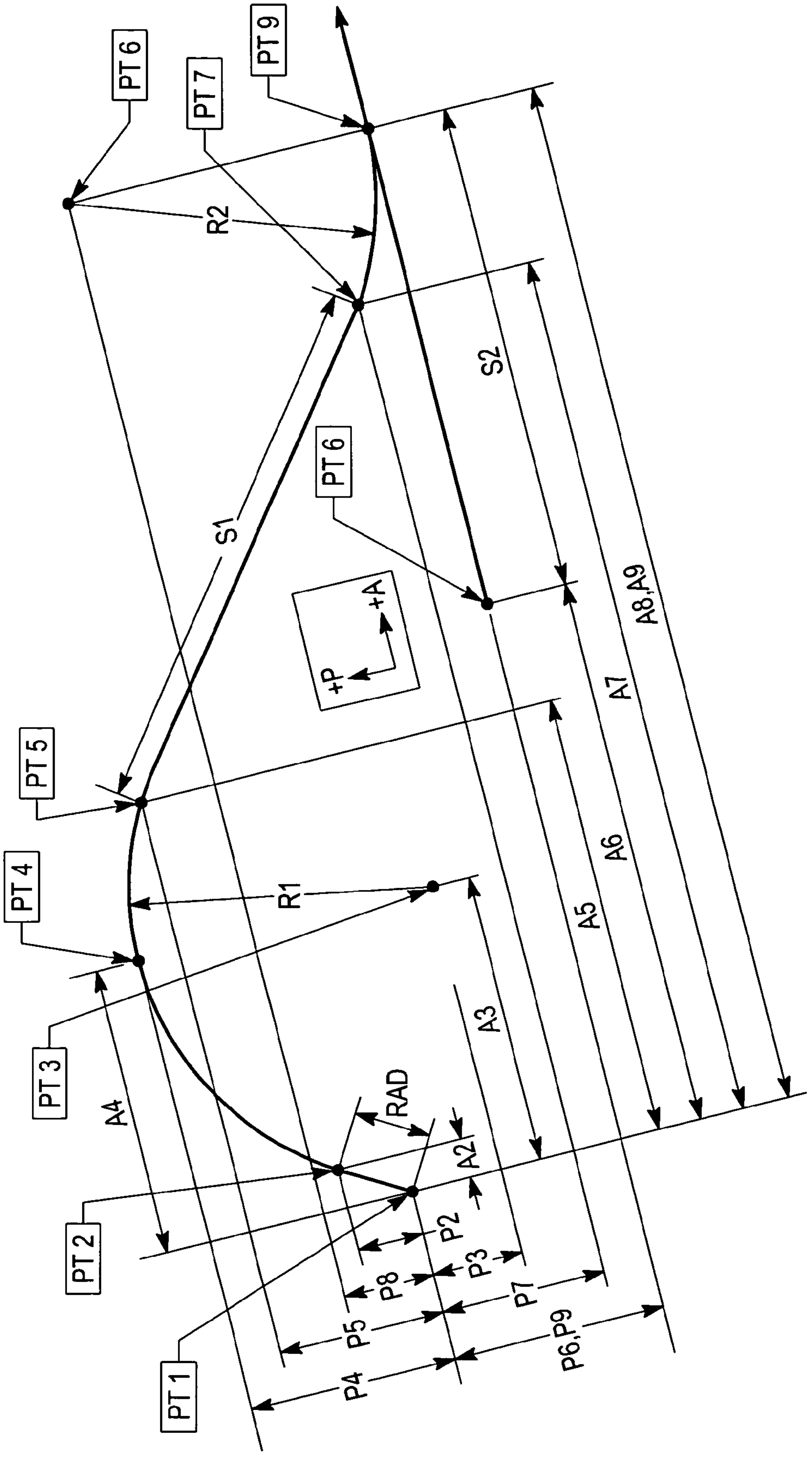
FIG. 22 illustrates an along track and perpendicular distances of the key points utilized in an exemplary embodiment of the present invention.

FIG. 21 is an algorithm/flowchart illustrating the determination logic process for determining the proper case for the initial parameters. The algorithm in FIG. 21 typically follows a determination by the system 100 that the standard single curve transition will result in an unflyable flight plan. Accordingly, the algorithm depicted in FIG. 21, results in a continuous path transition between two legs. Once the initial orientation and the initial turn direction determines whether the transition is a short transition or a long transition, the flowchart will describe the case geometry corresponding to the short and long transitions illustrated in FIGS. 3-15. Once the proper case and the associated geometry are determined, one skilled in the art can readily calculate the necessary speed, angle, and position of the particular turns to result in the transition from leg one to leg two. The positions of the points in the geometry can be computed based on a starting point. FIG. 22 shows an exemplary along track and perpendicular distances of the key points of the case one path geometry for the short paths. The perpendicular distances are positive away from the second leg and negative toward it. The along track distances are positive in the direction of the second leg. One skilled in the art can readily calculate the necessary segment start points, end points, turn radiuses, and straight line lengths based on the geometry of the specific case. The respective case geometries specify the number and orientation of the curved and straight segments needed to construct the geometry.

Referring again to FIG. 21, the logic determination process starts in step 2100. If it is determined in box 2102 that the initial path is too close to the second leg, the exemplary embodiment of the present invention generates a flight plan with case seven transition geometry, as indicated in step 2104, and the process ends at step 2106. Particularly, step 2102 will determine that the initial path is "too close" to leg two if the initial path is within, for example, 0.5 NM and 3° of the leg two. If the initial path is not too close to the second leg in step 2102, the process computes the path to the second leg using case one transition geometry and a 45° intercept angle in step 2108. The process proceeds to step 2110 and executes a path to the second leg using case one transition geometry and the default roll and intercept aggression factors. In step 2112, the process determines whether the initial orientation of the aircraft is zone A or zone B. If the initial orientation is zone A, the process determines whether the intercept distance is less than the RAD for the second turn in step 2114. If the intercept distance is greater than the RAD for turn two, the process generates the flight plan with a case one transition in step 2116, and the process ends at step 2118. If the intercept distance is less than the RAD distance in turn two, the process generates a flight plan with case two transition geometry and computes turn two to fit between the turn one end point and leg two in step 2120, and the process subsequently ends in step 2122. If the initial orientation is zone B in step 2112, the process proceeds to step 2124 in which the process computes a path to the second leg using case three transition geometry and a 45° intercept angle. The process then determines whether the calculated path overshoots leg 2 in step 2126. If the calculated path does not overshoot the second leg, the process proceeds to step 2128 and determines whether the intercept distance is greater than the RAD for turn two. If the intercept angle is greater than the RAD distance in step 2128, the process proceeds to step 2130 and generates a flight plan with case three transition geometry, and the process ends at step 2132. If the intercept angle is less than the RAD distance for turn two in step 2128, the process proceeds to step 2129 and generates a flight plan with case four transition geometry and expands turn one to be tangent to leg two, and the process ends at step 2131. If the calculated path overshoots leg two in step 2126, the process proceeds to step 2134 and computes a path to the second leg using case five transition geometry with default aggression factors. The process then determines whether the intercept distance is greater than the RAD in step 2136. If the intercept distance is greater than the RAD in step 2136, the process generates a flight plan with case five transition geometry in step 2138 and the process ends in step 2140. If the intercept distance is less than the RAD in step 2136, the process proceeds to step 2142 in which a path to the second leg is computed using case five transition geometry using adjusted roll aggression factors based on a negative intercept angle distance. The aggression factor can be adjusted based on the amount of overshoot required by the second leg. If the overshoot is small, then the intercept aggression factor is small, if the overshoot is large, then the aggression factor is large. This adjustment will attempt to keep the straight line segment larger than the RAD distance. The process then determines whether the intercept angle is acceptable in step 2144. If the intercept angle is acceptable in step 2144, the process generates a flight plan with case five transition geometry in step 2146 and the process ends at step 2148. If the intercept angle is not acceptable in step 2144, the process generates a flight plan with case six transition geometry by fixing turn one and fitting turn two to be tangent to the second leg in step 2150 and the process ends at step 2152.

Figure 23:
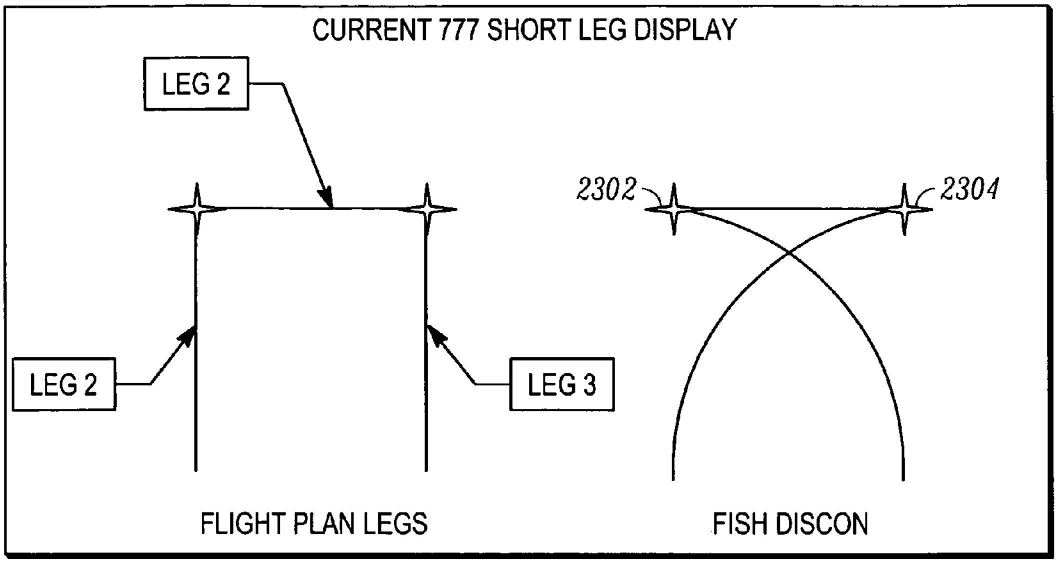
(PRIOR ART) FIG. 23
FIG. 23 illustrates a three leg track and the transition provided by a conventional flight planning system.

The present invention can also provide flyable transitions between three legs. A conventional path containing a short leg between two other legs and its associated transition is illustrated in FIG. 23. When confronted with the three legs illustrated on the left side of FIG. 23, conventional systems will produce a flight plan illustrated on the right side of FIG. 23. It is clear that an aircraft cannot fly the transitions 2302, 2304 mapped by the flight plan. This result is known as a "fish discontinuity," which is a result of the transitions for leg one to leg two and leg two to leg three overlapping.

The exemplary embodiment of the present invention utilizes the two leg algorithm illustrated in FIG. 21 and described above to provide a flyable transition for a three leg flight plan. The first step in computing the three leg path will is to determine the applicability of a continuous path that includes two standard single curve transitions. The single curve transitions are computed and checked for overlaps. If the single curve transitions do not overlap, then there is no need for further calculation and the path includes a single curve transition between legs one and two and a single curve transition between legs two and three. If the single curve transitions overlap, then the two single curve transitions are replaced with the continuous path transition for three legs.

Figure 24:
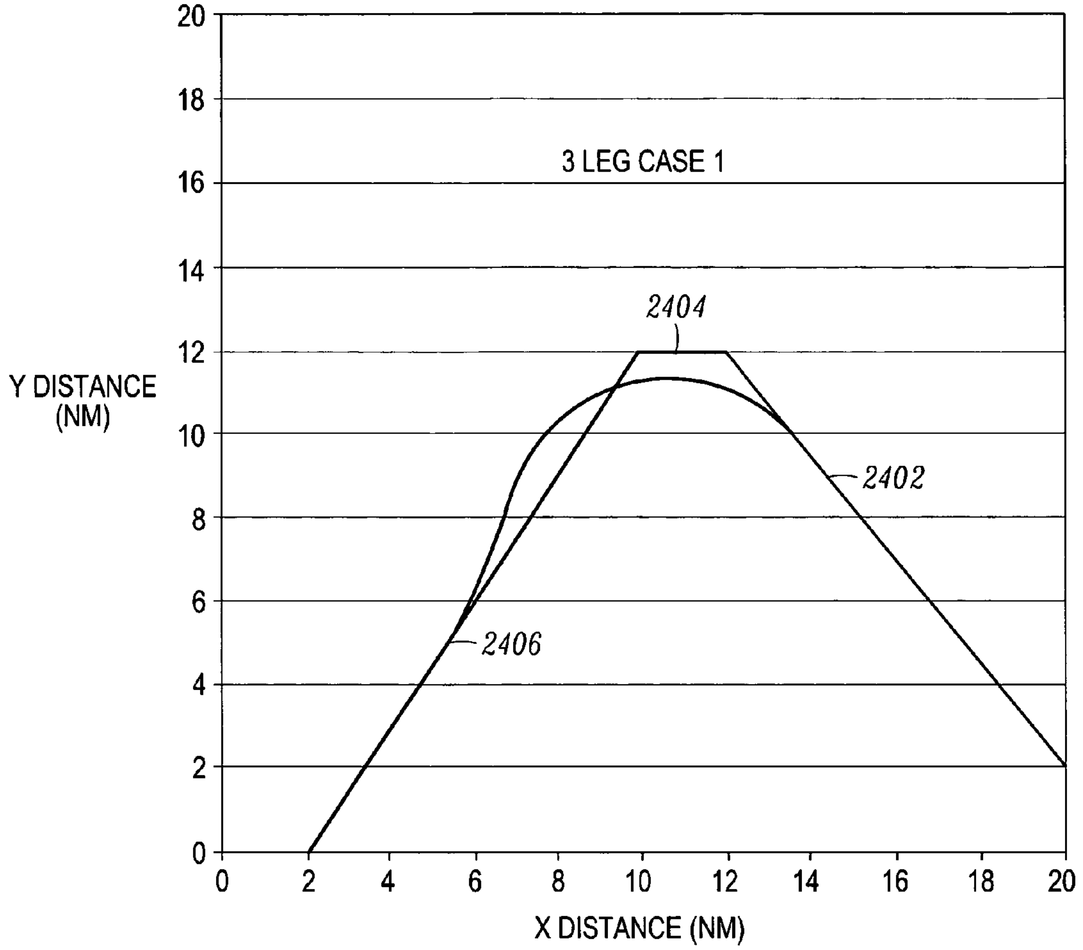
FIG. 24 is a schematic representation of the geometry of a first case for a three leg paths in accordance with an exemplary embodiment of the present invention.
Figure 25:
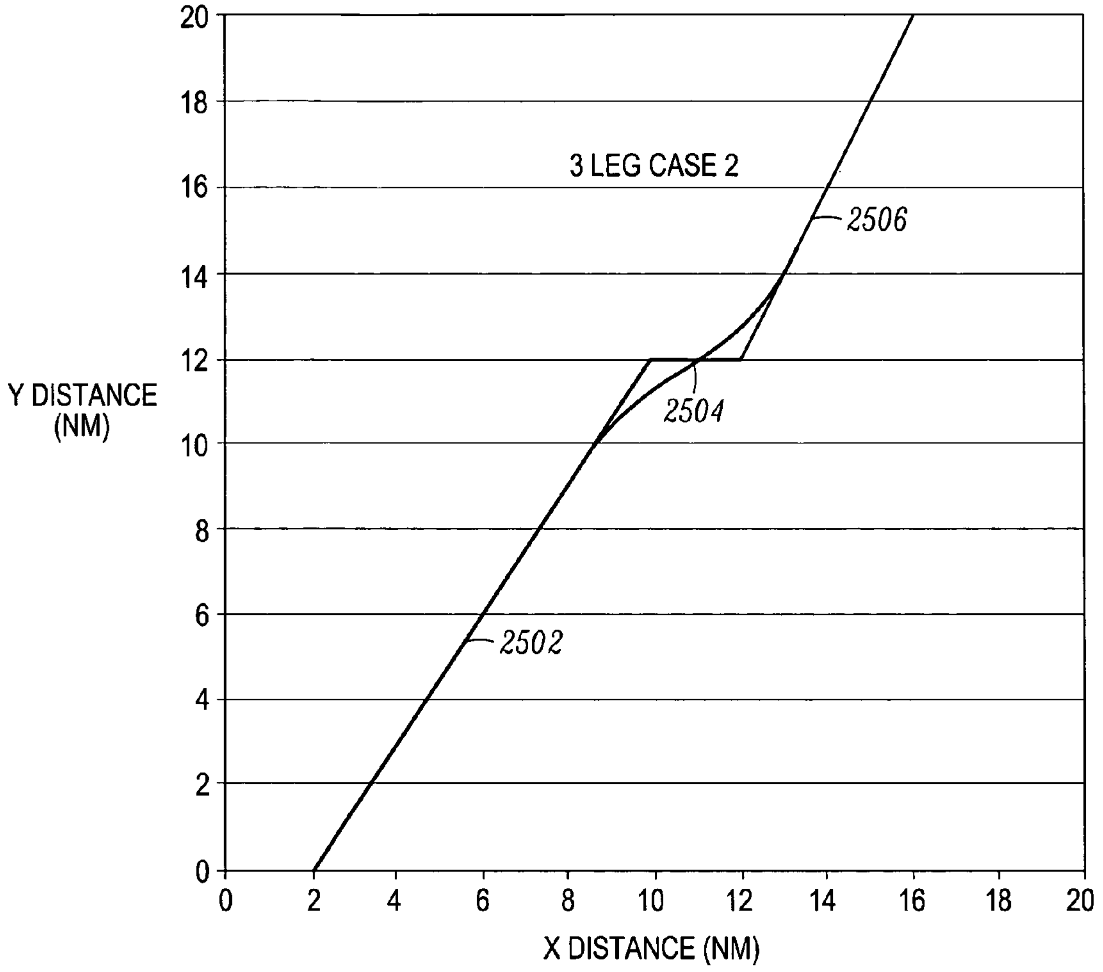
FIG. 25 is a schematic representation of the geometry of a second case for a three leg paths in accordance with an exemplary embodiment of the present invention.
Figure 26:
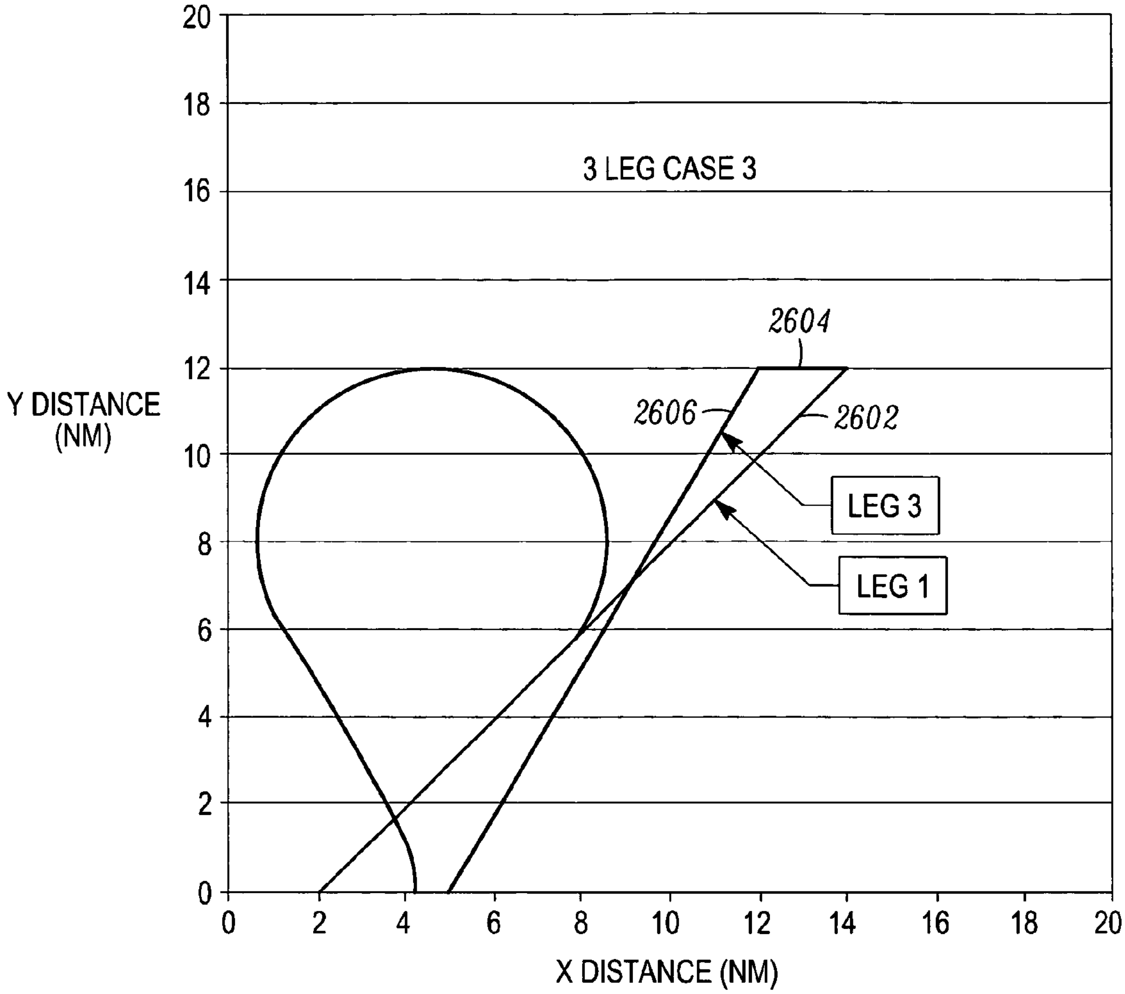
FIG. 26 is a schematic representation of the geometry of a third case for a three leg paths in accordance with an exemplary embodiment of the present invention.

FIGS. 24-26 show the three types of three leg transitions. The continuous path will be computed based on the two leg solution using the geometry data from the three legs, including the start and end points for the three legs, the courses of the three legs, and the target intercept course for the three leg solution as the course of the second leg. As shown in FIG. 24, case one includes a first leg 2402, a second leg 2404, and a third leg 2406 that results in a transition in which the first turn direction is the same as the second turn direction. As shown in FIG. 25, case two includes a first leg 2502, a second leg 2504, and a third leg 2506 in which the first and second turns have opposite turn directions. As shown in FIG. 26, case three includes a first leg 2602, a second leg 2604, and a third leg 2606 that results in the first and second turns having the same turn direction and the third leg 2606 crossing the first leg 2602. In each case, the three leg solution is determined by computing the start position along the first leg and using the second leg solution to compute a capture of the third leg.

Figure 27:
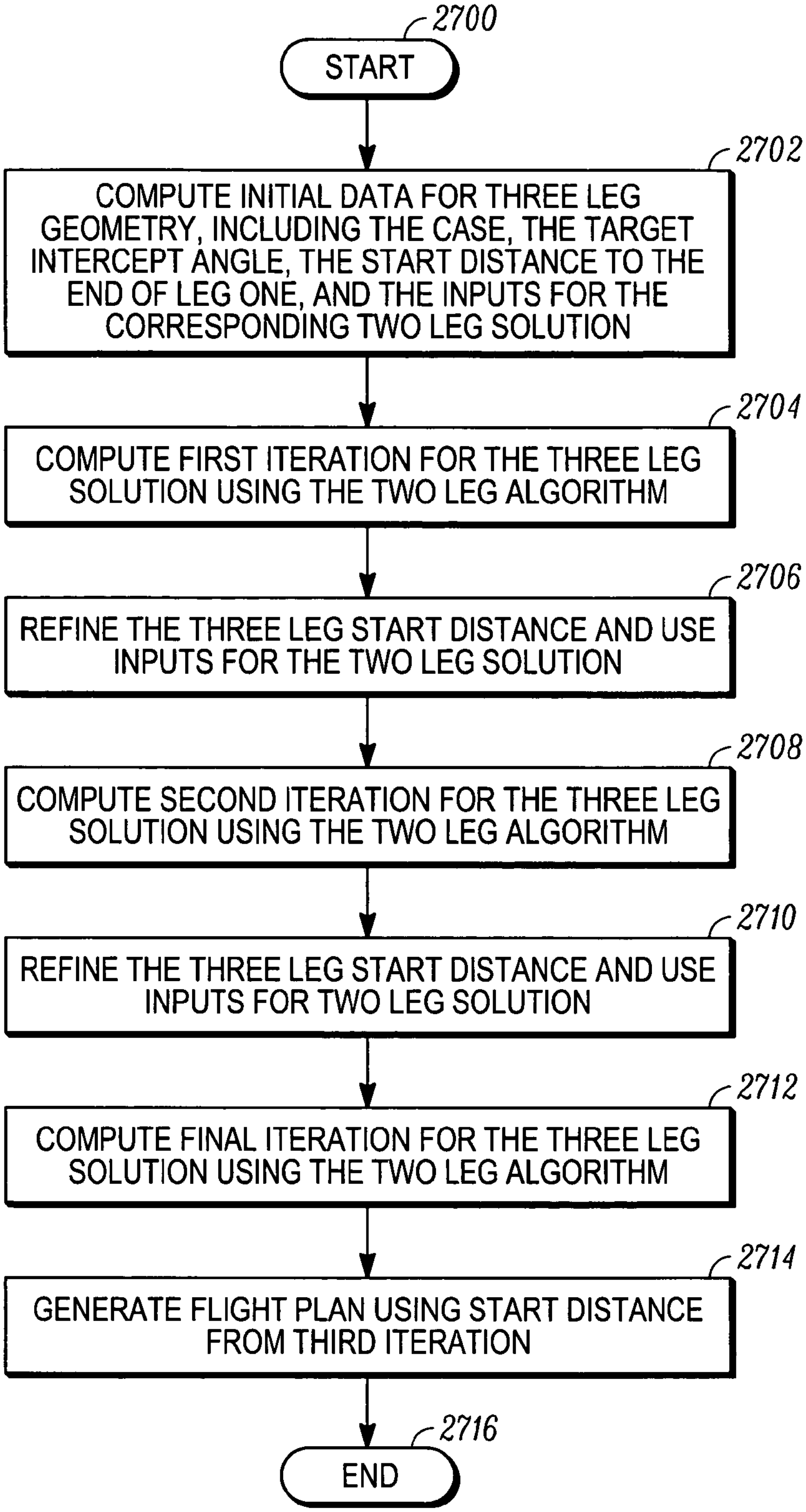
FIG. 27 is a determination logic flowchart of the three leg path in accordance with an exemplary embodiment of the present invention.

FIG. 27 illustrates the determination logic of the three leg process, which starts at step 2700. As shown in step 2702, the process computes the initial data for the three leg geometry and can consider the case, the target intercept angle, the start distance from the end of leg one, and the inputs for the corresponding two leg solution. As shown in step 2704, the three leg solution can be calculated using the two leg solution with the first leg and third leg as inputs. The course of the second leg can be the input desired intercept course to the third leg. As shown in step 2706, the start distance can be adjusted, and the two leg solution will be calculated again as shown in step 2708. In the exemplary embodiment shown in steps 2710-2714, calculating the two leg solution three times provides a satisfactory three leg result.

Figure 28:
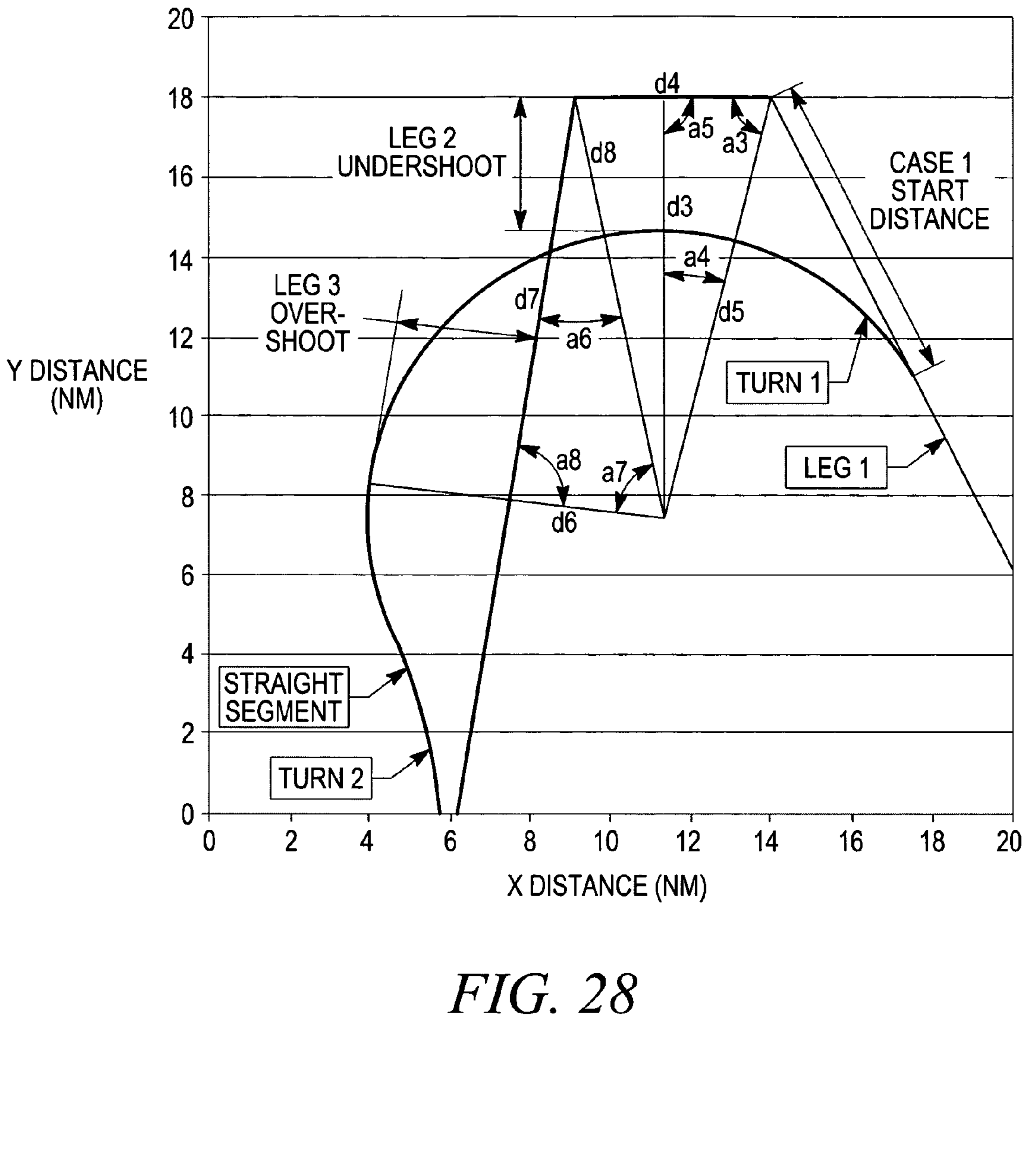
FIGS. 28 and 29 illustrate elements of the geometry used to calculate the three leg case one and case two start distance in accordance with an exemplary embodiment of the present invention.
Figure 29:
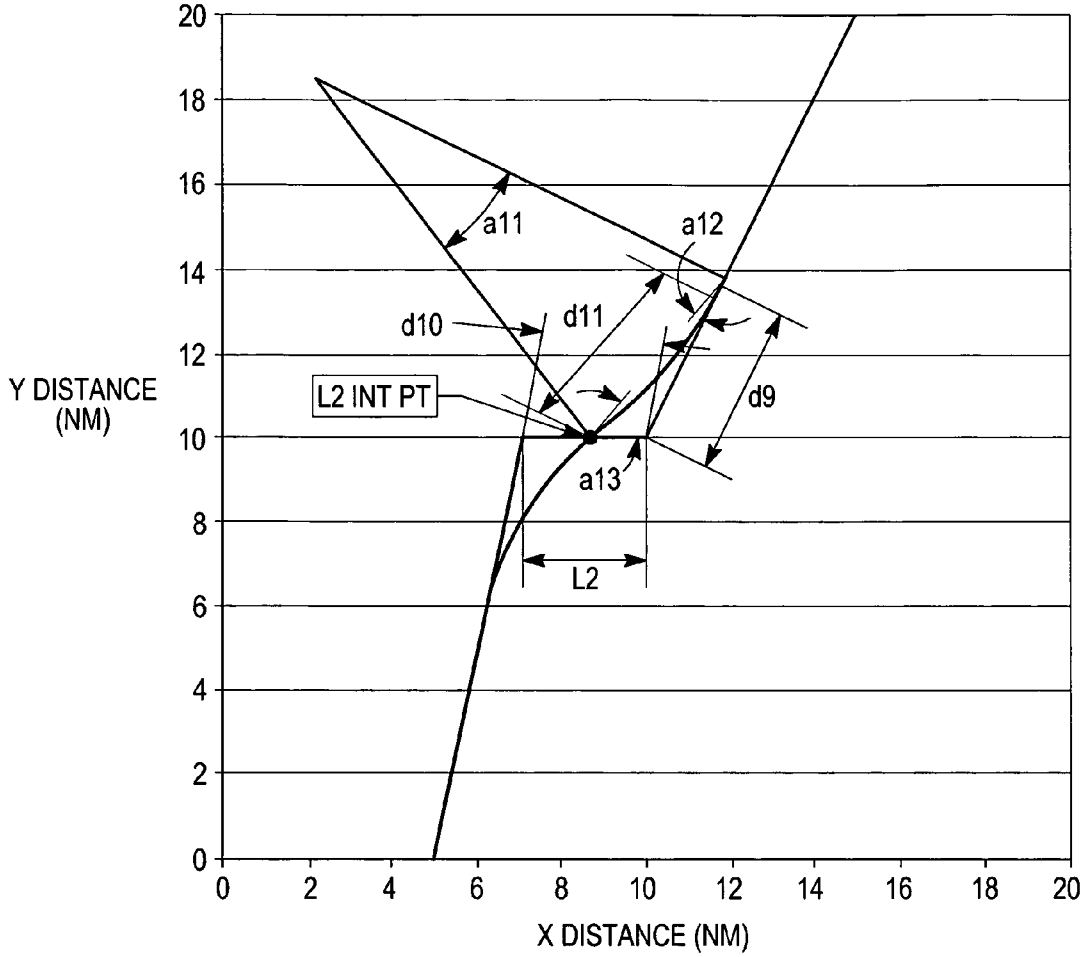

FIGS. 28 and 29 illustrate some of the geometry utilized to calculate the three leg cases one and two start distance.

As shown in FIG. 28, the start position for the three leg case one is determined by balancing the second leg undershoot and the third leg overshoot. As discussed above with reference to FIG. 27, the exemplary embodiment of the present invention utilizes three iterations to determine an acceptable solution. The first pass uses the turn anticipation distance computation for the start distance:

$$\text{StartDistance}=\text{Radius}\times\tan(\text{CourseChgLeg1toLeg2}\div 2)$$

The three leg case one start distance that equates the second leg undershoot and the third leg overshoot is computed as follows:

$$d3-r1=r1-d6$$

The ratio of third leg overshoot to second leg undershoot is used to create the new three leg second pass start distance for the case two. A final, third iteration is made to balance the undershoot with the overshoot.

The three leg case two transition start distance is computed using the following equations:

$$a11=\cos-1(1-d10/2r1)$$

$$d10=L2\cdot\text{Sin}(\text{Leg2}Crs-\text{Leg1}Crs)$$

$$d11=(r1\cdot\text{Sin}(a11)/\text{Sin}((180-a11)/2)$$

$$a12=90-((180-a11)/2)$$

$$a13=90+((180-a11)/2)-(\text{Leg2}Crs-\text{Leg1}Crs)$$

$$d9=\text{StartDist}=(\text{Sin}(a13)\cdot d11)/\text{Sin}(\text{Leg2}Crs-Leg1\,Crs)$$

Figure 30:
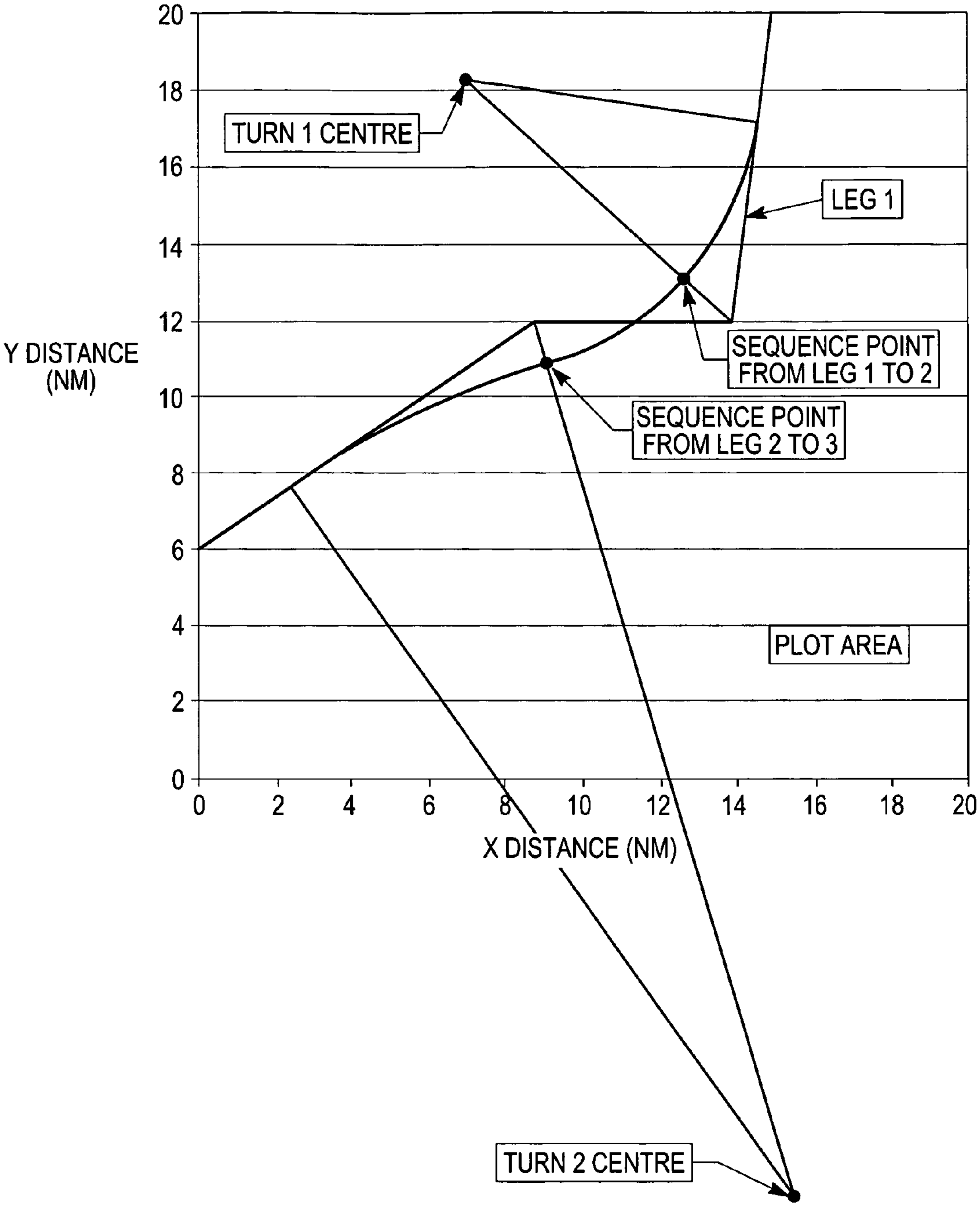
FIG. 30 illustrates a three leg continuous path and the associated sequence points in accordance with an exemplary embodiment of the present invention.
Figure 31:
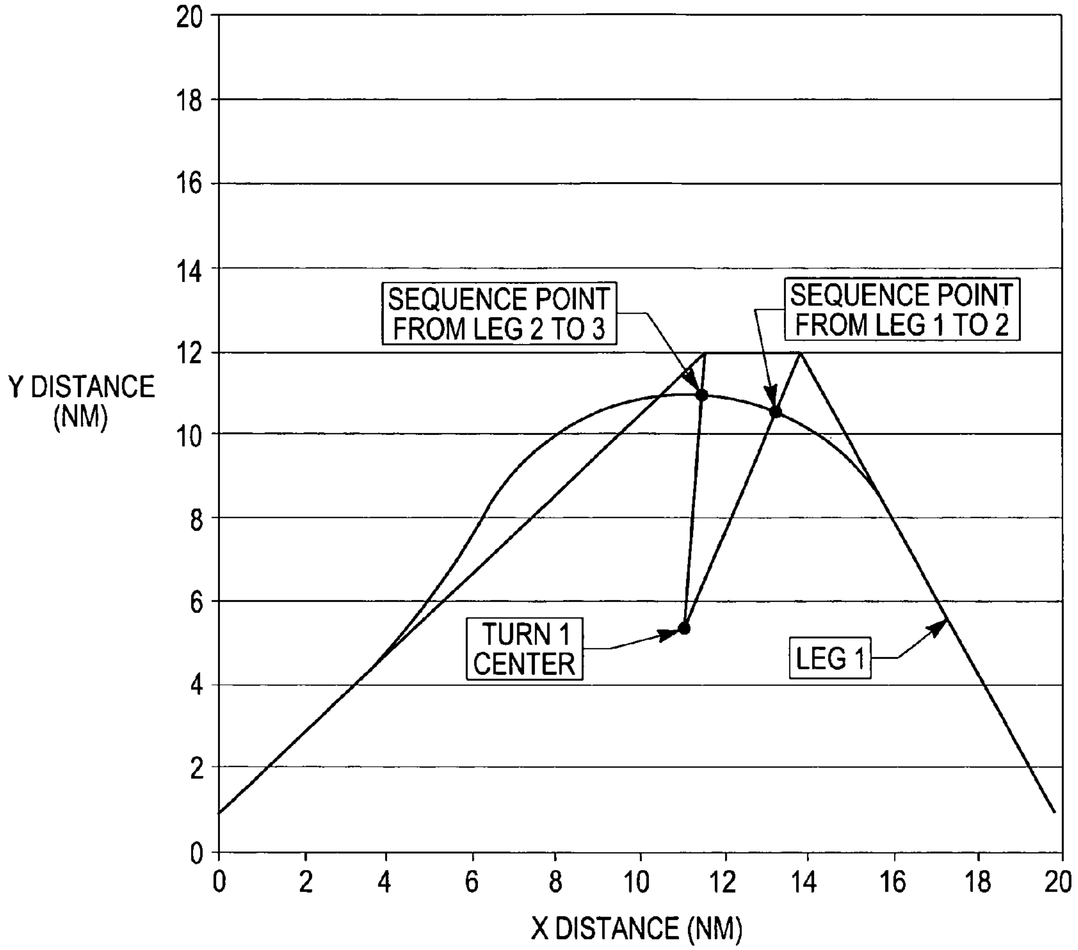
FIGS. 31 and 32 illustrate two three leg cases and the associated sequence points calculated in accordance with an exemplary embodiment of the present invention.
Figure 32:
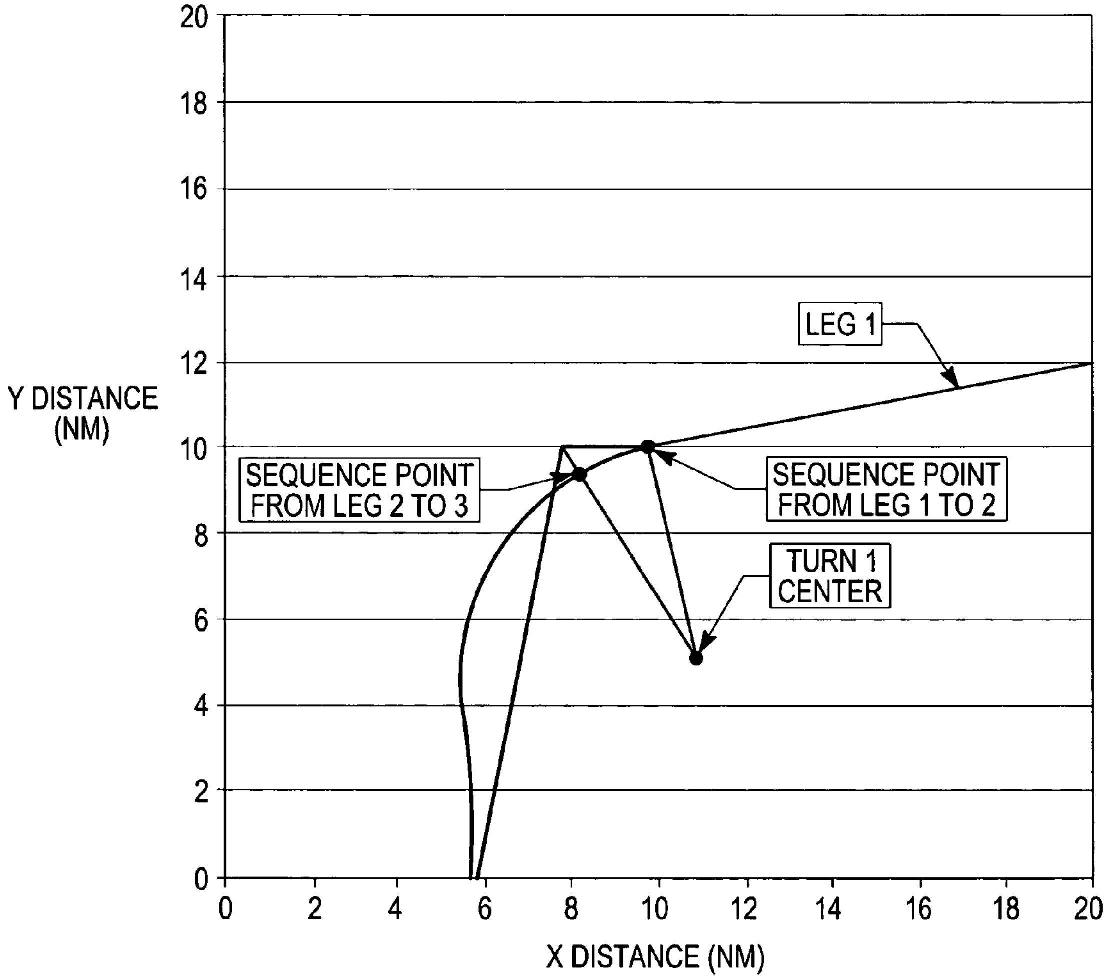

Exemplary embodiments of the present invention also include leg sequence point processing. The leg sequence point processing enables the system to control to the appropriate segments making up the leg. As the aircraft proceeds over the computed path, the system will indicate to the pilot which leg has been sequenced and which is active. Each leg includes other parameters controlled by the system that will become active once a leg is active. These include speed and altitude targets. The leg sequence points can be determined after each path transition is computed. These are used as a starting point for the next transition if an overlap is found. Unlike standard single curve transitions, where the sequence point is at the bisector of the first and second legs, the sequence points for the continuous path is at the closest points to the waypoints. FIG. 30 shows a three leg continuous path and the associated sequence points. In this case, the sequence point from the first leg to the second leg can be found by the intersection of the first turn with a line from the first turn center to the waypoint between the first and second legs. The sequence point from the second leg to third leg can be found by the intersection of second turn with a line from the second turn center to the waypoint between the second and third legs. FIGS. 31 and 32 show two other three leg cases. If a sequence point falls on a straight segment, the segment will be divided into two new straight segments. The sequence point may be collocated with a waypoint in cases such as illustrated in FIG. 32. If a sequence point is not found on any of the transition segments, then it will be set at the start or end transition points, whichever is closest to the waypoint. Sequence points should remain in order of the legs that they are related to. For example, the sequence point between the third and fourth legs should occur after the sequence point between the second and third legs.

Exemplary embodiment of the present invention can further provide continuous transitions between four or more legs in which the typical transition would result in discontinuities. This transition can be constructed by first computing the three leg path for the first three legs. Then, a second two leg path is constructed starting at the sequence point between the second and third legs. The two leg algorithm described above can be used using the next leg as the intercept course to the following leg. For example, if there are five legs, then the path would be refined starting at the sequence point between the third and fourth legs. This processing will continue until a transition through all consecutive legs has been completed.

Figure 33:
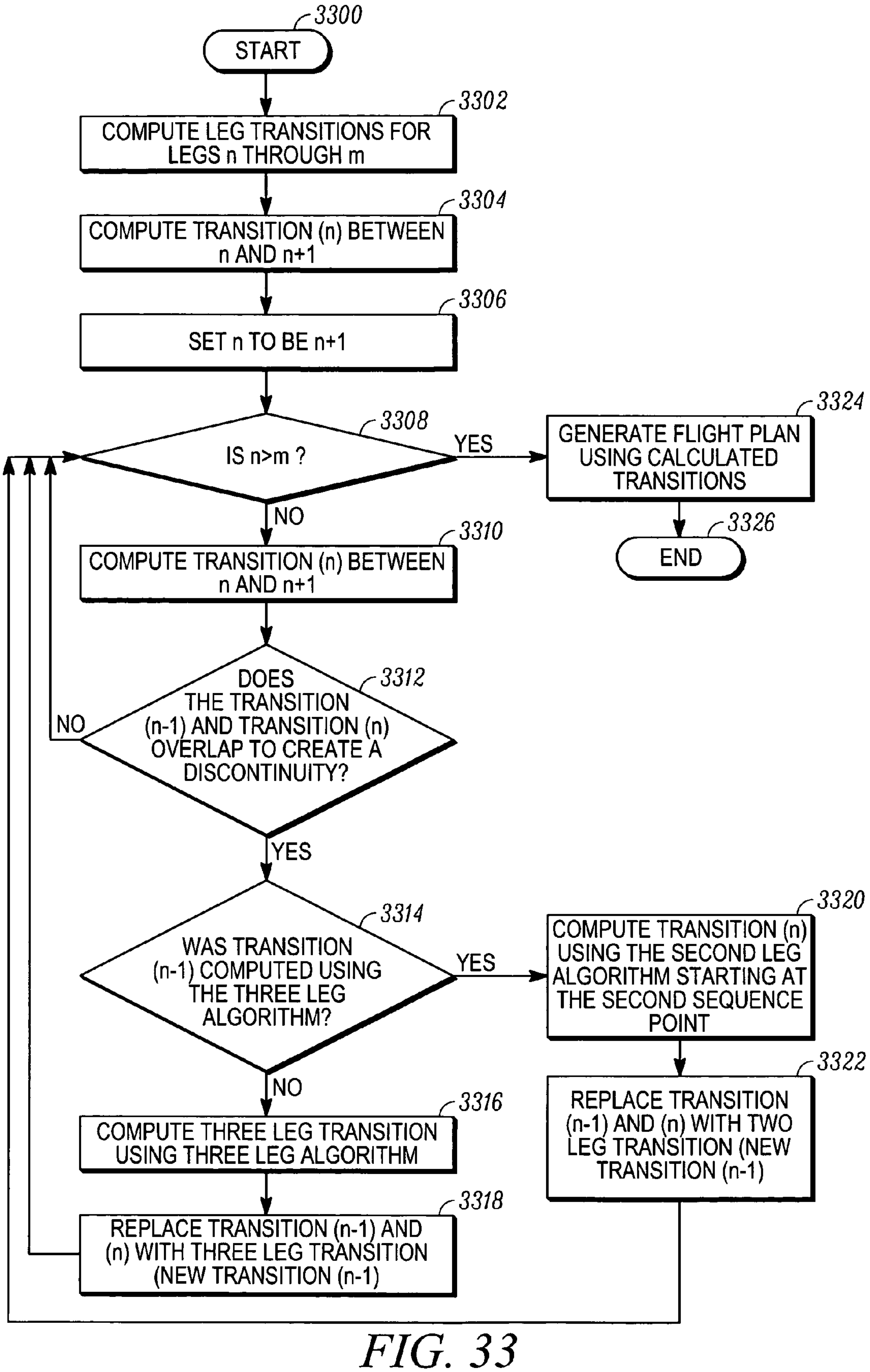
FIG. 33 is a multi-leg processing logic flowchart in accordance with an exemplary embodiment of the present invention.

The logic determination process for computing a path with a transition for four or more legs is described more generically in FIG. 33. The process starts at step 3302 to compute leg transitions for legs n-m, where n is initially leg one and m can be an integer five or greater. In step 3304, the process computes the transition (n) between leg n and leg n+1. The process then proceeds to the next leg in step 3306. Assuming that n is not greater than m in step 3308, the process computes a transition (n) between leg n and leg n+1 in step 3310. The process then determines in step 3312 whether the transition (n−1) and transition (n) overlap to create a discontinuity. If the transitions (n−1) and (n) do not create a discontinuity in step 3312, the process checks to see if there are additional legs in step 3308. If the transitions (n−1) and (n) do create a discontinuity in step 3312, the process determines whether the transition (n−1) was computed using a three leg algorithm. If it was not, the process proceeds to step 3316 to compute the three leg transition using the three leg algorithm in step 3314. The process then proceeds to step 3318 to replace transition (n−1) and (n) with a three leg transition (new transition (n−1)). After step 3318, the process proceeds to step 3308 to determine if any legs remain. In step 3314, if the transition (n−1) was computed using a three leg algorithm, the process proceeds to step 3320 to compute the transition (n) using the second leg algorithm starting at the second sequence point. The process then proceeds to step 3322 to replace transition (n−1) and (n) with a three leg transition (new transition (n−1)). After step 3322, the process proceeds to step 3308 to determine if any legs remain. When no legs remain in step 3308, the process generates a flight plan in step 3324 using the calculated transition, and the process ends at step 3326.

If the sequence point falls on a straight segment when processing a multi-leg path, the distance before and after the sequence point will be checked to see if it is less than RAD for a maximum bank. If the new straight segments are shorter than the max RAD, the sequence point will be moved to the closest curved segment start or end point (before or after) the straight segment. This will avoid producing a straight to curved segment combination that does not allow an appropriate RAD length. Otherwise, a sequence point dividing a straight segment is acceptable.

Figure 34:
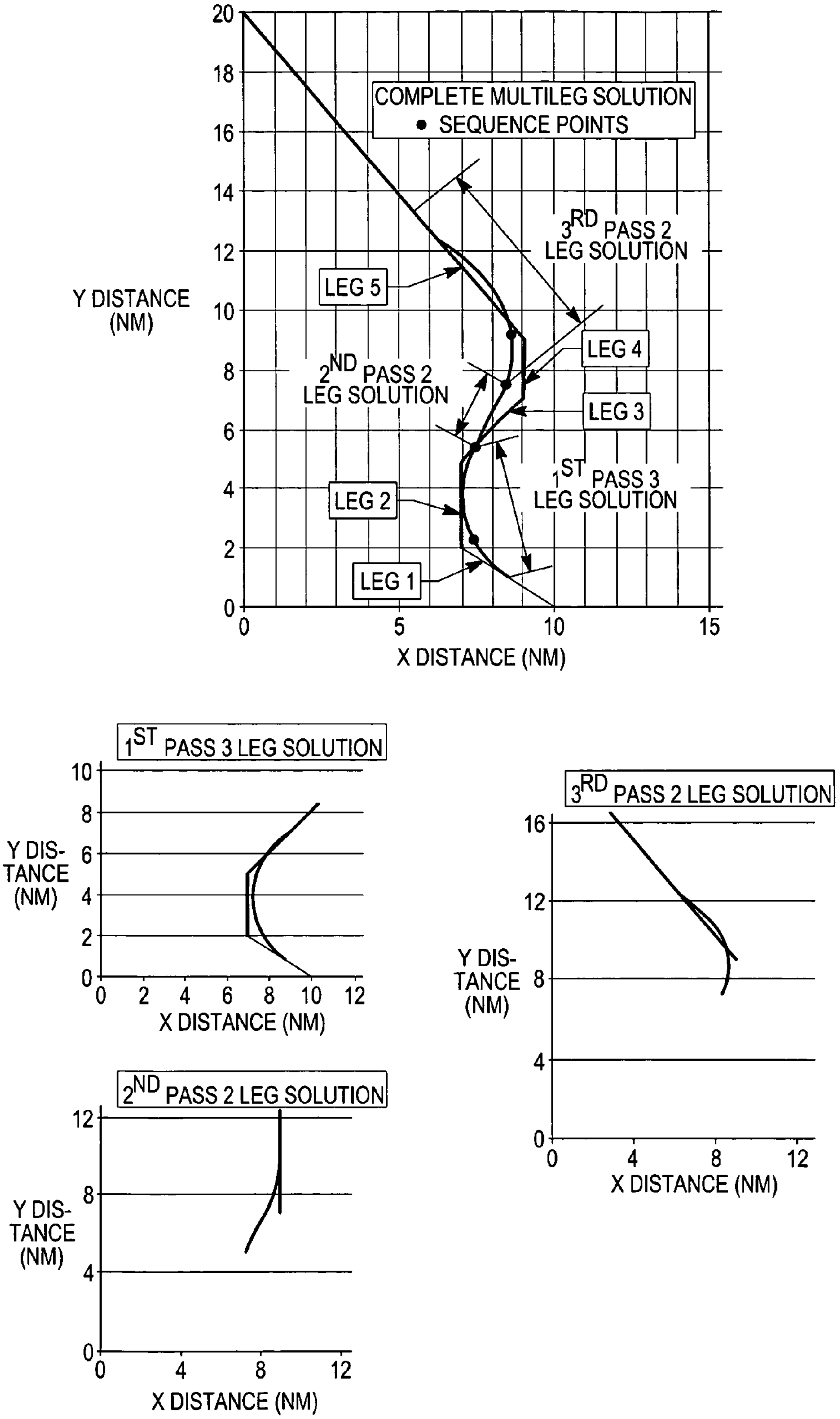
FIGS. 34-36 illustrate examples of multi-leg transitions in accordance with an exemplary embodiment of the present invention.
Figure 35:
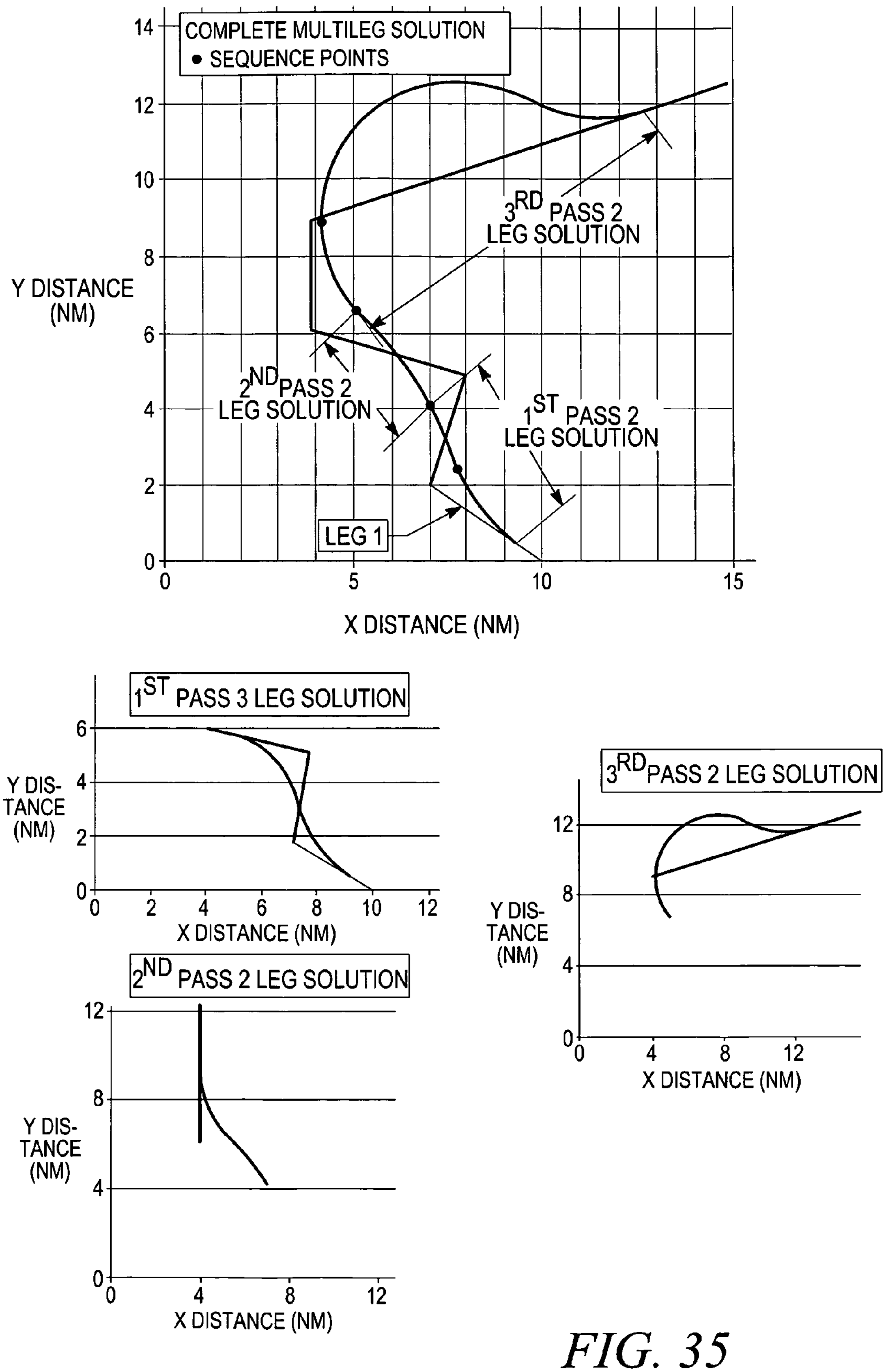
Figure 36:
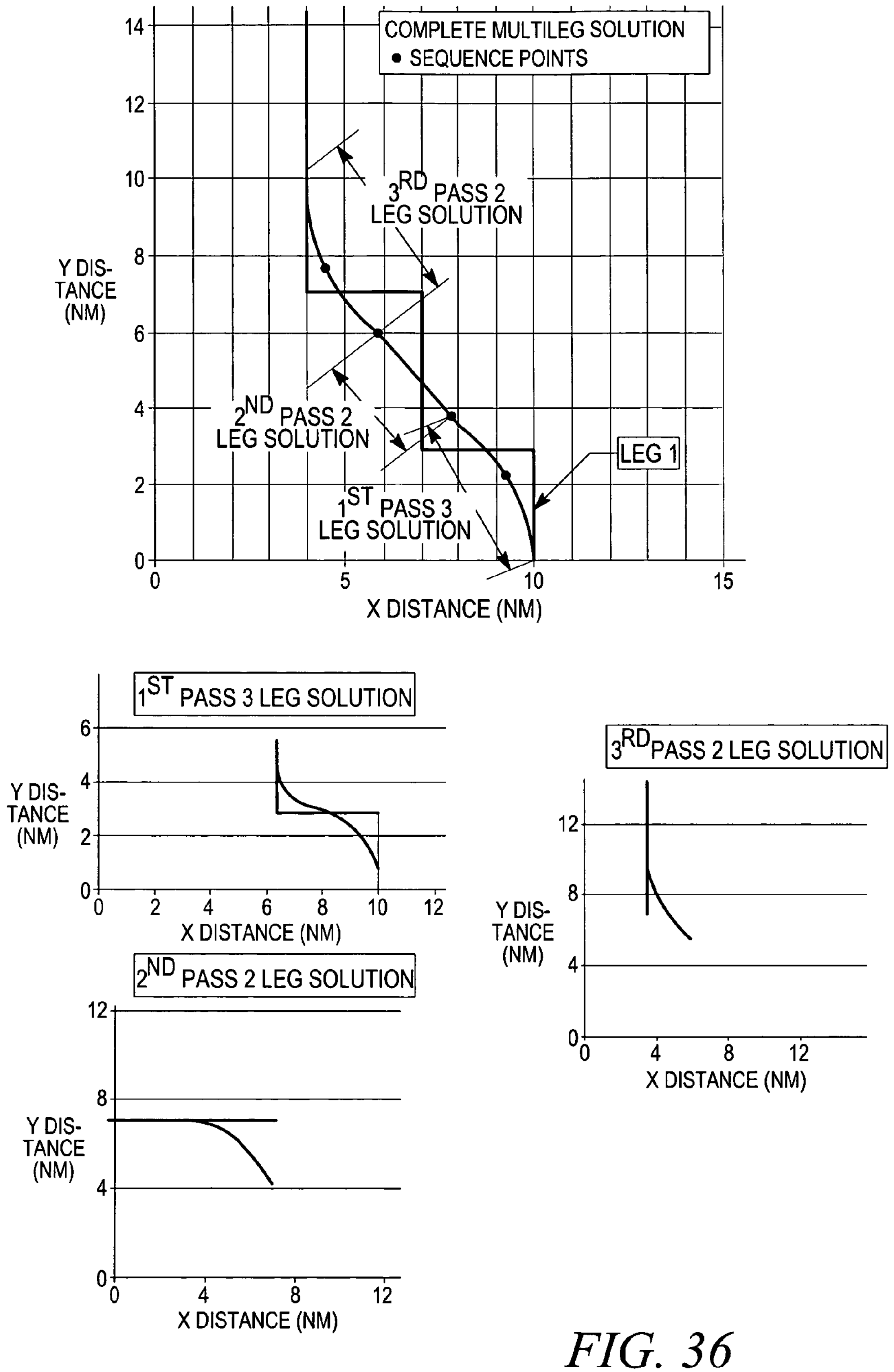

FIGS. 34-36 illustrate examples of multi leg transitions. Each of the FIGS. 34-36 illustrates a final multi-leg path and the three, two, and two leg paths that were computed to form it.

As a general matter, the exemplary embodiments of the present invention can provide a system and method for generating a path flyable by an aircraft, and can particularly provide a path with flyable transitions between multiple legs. Exemplary embodiments can include one or more of the following features: a display of the actual path to be flown to the pilot; providing a continuous path for the aircraft, regardless of speed changes; providing a path that accounts for the proper initial turn direction; providing a path having combinations of straight and curved segments; providing a path having segment breaks at the intended sequence points; providing a path that minimizes the total distance from the path to the individual waypoints; providing a path that includes a straight segment between opposite turn direction arcs to minimize cross track error; providing a path that is limited to a zone outlined first and second legs for the first curve; providing a path that includes a capability for greater than 45° intercept angles; providing a method and system in which that two leg paths are building blocks for the multiple short leg paths; providing a path in which the straight segment between curves is at least as long as the RAD; and providing a path in which a RAD is included if the first leg is a curve. Moreover, the algorithms and flowcharts described above can be modified and/or optimized based on the particular situation and/or requirements without departing from the scope of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for generating a flight plan between an initial position and a destination, the system comprising:

an input device configured to receive inputs related to the destination;

a memory configured to store data related to the destination; and a processor configured to retrieve data from the memory and to generate the flight plan from the initial position to the destination, wherein the flight plan includes a plurality of legs and an initial plurality of transitions between the legs, wherein one of the plurality of legs is a first leg and a subsequent leg is a second leg, wherein the processor is further configured to determine whether each of the initial plurality of transitions between the legs is physically flyable and to provide a physically flyable transition between the legs if the transition is physically unflyable, wherein the physically flyable transition includes at least one of a long transition and a short transition, the long transition being selected from a long transition group and the short transition being selected from a short transition group, wherein the short transition group includes at least two of a first short transition that includes a first turn in a first direction, a second turn in a second direction, and a straight segment between the first and second turns, a second short transition that includes a first turn in the first direction and the second turn in a second direction, a third short transition that includes a first turn in the second direction, a second turn in the second direction, and a straight segment between the first and second turns, a fourth short transition that includes a first turn in the second direction, a fifth short transition that includes a first turn in the second direction that overshoots the second leg, a second turn in the first direction, and a straight segment between the first and second turns, a sixth short transition that includes a first turn in the second direction that overshoots a second leg and a second turn in the first direction, and a seventh short transition that includes a single straight segment; and wherein the long transition group includes at least two of a first long transition that includes a first looped turn in a first direction, a second turn in a second direction, and a straight segment between the first and second turns, a second long transition that includes a first looped turn in the first direction that overshoots the second leg, and a second turn in the second direction, a third long transition that includes a first looped turn in the second direction, a second turn in the second direction, and a straight segment between the first and second turns, a fourth long transition that includes a first turn in the second direction and a second turn in the second direction, a fifth long transition that includes a first looped turn in the second direction that overshoots the second leg, a second turn in the first direction, and a straight segment between the first and second turns, and a sixth long transition that includes a first looped turn in the second direction that overshoots the second leg and a second turn in the first direction.

2. The system of claim 1, wherein the processor is configured to initially generate the plurality of transitions as single curve transitions, wherein the processor is configured to determine whether the single curve transitions are physically flyable, and wherein the process replaces any physically unflyable, single curve transition with a continuous path transition.

3. The system of claim 2, wherein the at least one continuous path transition is a transition between at least one of two legs separated by a short leg, at least four legs with two or more short legs, two legs resulting in a relatively large course change, two legs resulting in an overfly, two legs that require a specific turn direction, two discontinuous legs, and a start position and a desired leg.

4. The system of claim 2, wherein the physically unflyable transition includes at least one of at least one turn that is physically unflyable and a discontinuity.

5. The system of claim 2, wherein the processor generates the flight plan based on an aggression factor, wherein the aggression factor is at least one of a roll angle aggression factor, an intercept angle aggression factor, and a combination roll angle/intercept angle aggression factor.

6. The system of claim 2, wherein the continuous path transition between at least two legs is a transition between three legs.

7. The system of claim 6, wherein the transition between three legs is selected from a group of three transitions.

8. The system of claim 2, wherein the transition between at least two legs is a transition between more than three legs.

9. A system for generating a flight plan between an initial position and a destination, the system comprising:

an input device configured to receive inputs related to the destination;

a memory configured to store data related to the destination; and a processor configured to retrieve data from the memory and to generate the flight plan from the initial position to the destination, wherein the flight plan includes a plurality of legs and an initial plurality of transitions between the legs, wherein the processor is further configured to determine whether each of the initial plurality of transitions between the legs is physically flyable and to provide a physically flyable transition between the legs if the transition is physically unflyable, wherein the processor is configured to initially generate the plurality of transitions as single curve transitions, wherein the processor is configured to determine whether the single curve transitions are physically flyable, and wherein the process replaces any physically unflyable, single curve transition with a continuous path transition, wherein the physically unflyable transition includes at least one of at least one turn that is physically unflyable and a discontinuity, wherein the at least one continuous path transition is one of a long transition and a short transition, wherein the long transition is selected from a group of six long transitions, and wherein the short transition is selected from a group of seven short transitions, wherein one of the plurality of legs is a first leg and a subsequent leg is a second leg, and wherein the group of seven short transitions includes a case one short transition that includes a first turn in a first direction, a second turn in a second direction, and a straight segment between the first and second turns, a case two short transition that includes a first turn in the first direction and the second turn in a second direction, a case three short transition that includes a first turn in the second direction, a second turn in the second direction, and a straight segment between the first and second turns, a case four short transition that includes a first turn in the second direction, a case five short transition that includes a first turn in the second direction that overshoots the second leg, a second turn in the first direction, and a straight segment between the first and second turns, a case six short transition that includes a first turn in the second direction that overshoots a second leg and a second turn in the first direction, and a case seven short transition that includes a single straight segment.

10. The system of claim 9, wherein the group of six long transitions includes a case one long transition that includes a first looped turn in a first direction, a second turn in a second direction, and a straight segment between the first and second turns, a case two long transition that includes a first looped turn in the first direction that overshoots the second leg, and a second turn in the second direction, a case three long transition that includes a first looped turn in the second direction, a second turn in the second direction, and a straight segment between the first and second turns, a case four long transition that includes a first turn in the second direction and a second turn in the second direction, a case five long transition that includes a first looped turn in the second direction that overshoots the second leg, a second turn in the first direction, and a straight segment between the first and second turns, a case six long transition that includes a first looped turn in the second direction that overshoots the second leg and a second turn in the first direction.

11. A method for generating a flight plan between an initial position and a destination, the flight plan having a plurality of legs, the method comprising:

providing an initial plurality of transitions between the legs;

determining whether each of the initial plurality of transitions is physically flyable; and replacing any physically unflyable initial transition with a flyable transition, wherein the providing step includes providing a plurality of single curve transitions, wherein the determining step includes determining whether each of the single curve transitions is physically flyable or physically unflyable, wherein the physically unflyable transitions include at least one of a horizontal turn that is physically unflyable and a discontinuity; and wherein the replacing step includes replacing the unflyable single curve transitions with continuous path transitions, wherein the providing step includes one of selecting a long transition from a group of six long transitions and selecting a short transition from a group of seven short transitions, and, wherein one of the plurality of legs is a first leg and a subsequent leg is a second leg, and wherein the group of six long transitions includes a case one long transition that includes a first looped turn in a first direction, a second turn in a second direction, and a straight segment between the first and second turns, a case two long transition that includes a first looped turn in the first direction that overshoots the second leg, and a second turn in the second direction, a case three long transition that includes a first looped turn in the second direction, a second turn in the second direction, and a straight segment between the first and second turns, a case four long transition that includes a first turn in the second direction and a second turn in the second direction, a case five long transition that includes a first looped turn in the second direction that overshoots the second leg, a second turn in the first direction, and a straight segment between the first and second turns, a case six long transition that includes a first looped turn in the second direction that overshoots the second leg and a second turn in the first direction.

12. The method of claim 11, wherein providing step includes providing at least one continuous path transition between at least one of two legs separated by a short leg, at least four legs with two or more short legs, two legs resulting in a relatively large course change, two legs resulting in an overfly, two legs that require a specific turn direction, two discontinuous legs, and a start position and a desired leg.

13. The method of claim 11, wherein the group of seven short transitions includes a case one short transition that includes a first turn in a first direction, a second turn in a second direction, and a straight segment between the first and second turns, a case two short transition that includes a first turn in the first direction and the second turn in a second direction, a case three short transition that includes a first turn in the second direction, a second turn in the second direction, and a straight segment between the first and second turns, a case four short transition that includes a first turn in the second direction, a case five short transition that includes a first turn in the second direction that overshoots the second leg, a second turn in the first direction, and a straight segment between the first and second turns, a case six short transition that includes a first turn in the second direction that overshoots a second leg and a second turn in the first direction, and a case seven short transition that includes a single straight segment.

14. The method of claim 11, wherein the providing step includes considering an aggression factor, wherein the aggression factor is at least one of a roll angle aggression factor, an intercept angle aggression factor, and a combination roll angle/intercept angle aggression factor.

15. The method of claim 11, wherein the transition between at least two legs is a transition between at least three legs.

16. The method of claim 15, wherein the transition between three legs is selected from a group of three transitions.

* * * * *